United States Patent
Lee et al.

(10) Patent No.: US 12,511,535 B2
(45) Date of Patent: *Dec. 30, 2025

(54) NEURAL NETWORK METHOD AND APPARATUS

(71) Applicants: Samsung Electronics Co., Ltd., Suwon-si (KR); Seoul National University R&DB Foundation, Seoul (KR)

(72) Inventors: Junhaeng Lee, Hwaseong-si (KR); Sungjoo Yoo, Seoul (KR); Eunhyeok Park, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,572

(22) Filed: Dec. 15, 2021

(65) Prior Publication Data

US 2022/0108178 A1    Apr. 7, 2022

Related U.S. Application Data

(63) Continuation of application No. 15/880,690, filed on Jan. 26, 2018, now Pat. No. 11,250,320.

(30) Foreign Application Priority Data

May 25, 2017    (KR) .................... 10-2017-0064884

(51) Int. Cl.
*G06N 3/08*    (2023.01)
*G06N 3/04*    (2023.01)
(Continued)

(52) U.S. Cl.
CPC ............... *G06N 3/08* (2013.01); *G06N 3/04* (2013.01); *G06N 3/045* (2023.01); *G06N 3/084* (2013.01); *G06N 3/063* (2013.01)

(58) Field of Classification Search
CPC .......... G06N 3/08; G06N 3/04; G06N 3/0454; G06N 3/084; G06N 3/063
See application file for complete search history.

(56) References Cited

U.S. PATENT DOCUMENTS 9,129,220 B2    9/2015  Aparin et al.
2009/0150308 A1   6/2009  Wang et al.
(Continued)

FOREIGN PATENT DOCUMENTS

KR    10-1466205 B1    11/2014
KR    10-2016-0034814 A    3/2016

OTHER PUBLICATIONS

Hwang et al., Fixed-point feedforward deep neural network design using weights +1, 0, and −1, 2014 IEEE Workshop on Signal Processing Systems (SiPS), Oct. 20-22, 2014, 6 pages (Year: 2014).*

(Continued)

*Primary Examiner* — Daniel T Pellett
(74) *Attorney, Agent, or Firm* — NSIP Law

(57) ABSTRACT

Provided are a neural network method and an apparatus, the method including obtaining a set of floating point data processed in a layer included in a neural network, determining a weighted entropy based on data values included in the set of floating point data, adjusting quantization levels assigned to the data values based on the weighted entropy, and quantizing the data values included in the set of floating point data in accordance with the adjusted quantization levels.

10 Claims, 11 Drawing Sheets

(51) Int. Cl.
G06N 3/045 (2023.01)
G06N 3/063 (2023.01)
G06N 3/084 (2023.01)

(56) References Cited

U.S. PATENT DOCUMENTS

2011/0119467 A1 5/2011 Cadambi et al.
2016/0086078 A1 3/2016 Ji et al.

OTHER PUBLICATIONS

Guiasu, Silviu, Grouping Data by Using the Weighted Entropy, Journal of Statistical Planning and Inference 15 (1986), Elsevier Science Publishers B.V., pp. 63-69 (Year: 1986).*
Miyashita et al., Convolutional Neural Networks Using Logarithmic Data Representation, arXiv:1603.01025v2, Mar. 17, 2016, 10 pages (Year: 2016).*
Vajapeyam, Sriram, Understanding Shannon's Entropy Metric for Information, arXiv:1405.2061, Mar. 24, 2014, 6 pages (Year: 2014).*
Choi et al., Towards the Limit of Network Quantization, arXiv:1612:01543v1, Dec. 5, 2016, 20 pages (Year: 2016).*
Tu et al., Reducing the Model Order Of Deep Neural Networks Using Information Theory, arXiv:1605.04859v1, May 16, 2016, 6 pages (Year: 2016).*
Oland et al., Reducing Communication Overhead in Distributed Learning By An Order of Magnitude (Almost), 2015 IEEE International Conference on Acoustics, Speech and Signal Processing (ICASSP), Apr. 19-24, 2015, IEEE 2015, pp. 2219-2223 (Year: 2015).*
Courbariaux, Matthieu, et al. "Binarized Neural Networks: Training Neural Networks with Weights and Activations Constrained to +1 or −1." arXiv:1602.02830v3, Mar. 17, 2016 (11 pages in English).
Miyashita, D., et al., "Convolutional Neural Networks using Logarithmic Data Representation," arXiv:1603.01025v2 [cs.NE] Mar. 17, 2016 (10 pages in English).
Rastegari, Mohammad, et al. "Xnor-net: Imagenet Classification Using Binary Convolutional Neural Networks." *European Conference on Computer Vision. Springer International Publishing*, arXiv:1603.05279v4 [cs.CV] Aug. 2, 2016 (17 pages in English).
Hubara, Itay, et al. "Quantized Neural Networks: Training Neural Networks with Low Precision Weights and Activations." arXiv:1609. 07061v1 [cs.NE], Sep. 22, 2016 (29 pages in English).
Mitchell, M et al., "Building a Large Annotated Corpus of English: The Penn Treebank," *Journal Computational Linguistics*, vol. 19, Issue 2, Jun. 1993, pp. 313-330 (18 pages in English).
Deng, J et al., "ImageNet: A Large-Scale Hierarchical Image Database," Proceedings of the IEEE Conference on Computer Vision and Pattern Recognition, Miami, FL, USA, Jun. 2009, pp. 248-255 (8 pages in English).
Vanhoucke, A. et al. "Improving the speed of neural networks on CPUs," *Proceedings of the NIPS Deep Learning and Unspervised Feature Learning Workshop*, 2011, pp. 1-8 (8 pages in English).
Krizhevsky, A. et al., "ImageNet Classification with Deep Convolutional Neural Networks," Proceedings of the 26th Neural Information Processing Systems (NIPS), Lake Tahoe, Nevada, Dec. 2012, pp. 1097-1105 (9 pages in English).
Zaremba, W., et al. "Recurrent Neural Network Regularization," Cornell University Library—Neural and Evolutionary Computing, arXiv:1409.2329v5 [cs.NE] Feb. 19, 2015 (8 pages in English).

Hwang, K., et al., "Fixed-Point Feedforward Deep Neural Network Design Using Weights +1, 0, and −1," Proceedings of the IEEE Workshop on Signal Processing Systems SIPS, Oct. 2014. pp. 1-6 (6 pages in English).
Jia, Y. et al., "Caffe: Convolutional Architecture for Fast Feature Embedding," Proceedings of the 22nd ACM International Conference on Multimedia, Orlando, FL, USA, Nov. 2014, pp. 675-678 (4 pages in English).
Gottmer, M., "Merging Reality and Virtuality with Microsoft HoloLens", Theses Paper on Hunanities at Utrecht University, 2015. pp. 1-36 (36 pages in English).
Szegedy, C. et al., "Going deeper with convolutions," arXiv:1409. 4842v1 [cs.CV] Sep. 17, 2014 (12 pages in English).
Han, S., et al. "Deep Compression: Compressing Deep Neural Network with Pruning, Trained Quantization and Huffman Coding," arXiv:1510.00149v5 [cs.CV] Feb. 15, 2016 (14 pages in English).
Courbariaux, M. et al., "BinaryConnect: Training Deep Neural Networks with Binary Weights During Propagations," arXiv:1511. 00363v2 [cs.LG] Nov. 12, 2015 (9 pages in English).
Qiu, J., et al., "Going Deeper with Embedded FPGA Platform for Convolutional Neural Network," Proceedings of the ACM/SIGDA International Symposium on Field-Programmable Gate Arrays, Monterey, California, USA, Feb. 2016, pp. 1-31 (31 pages, in English).
He, K. et al., "Deep Residual Learning for Image Recognition," arXiv:1512.03385v1 [cs.CV] Dec. 10, 2015.
Harris, M., "Mixed-Precision Programming with CUDA 8," NVIDIA Developer Blog—https://devblogs.nvidia.com/mixed-precision-programming-cuda-8/, Oct. 2016, (12 pages in English).
Judd, P., et al., "Stripes: Bit-Serial Neural Network Computing," Proceedings of the 29th Annual IEEE/ACM International Symposium on Microarchitecture (MICRO), Taipei, Taiwan, Oct. 2016 (12 pages, in English).
Rastegari, M., et al., "XNOR-Net: ImageNet Classification Using Binary Convolutional Neural Networks," arXiv:1603.05279v1 [cs. CV] Mar. 16, 2016 (17 pages, in English).
Wu, Y., et al., "Google's Neural Machine Translation System: Bridging the Gap between Human and Machine Translation," arXiv:1609.08144v2 [cs.CL] Oct. 8, 2016 (23 pages, in English).
Jia, Y. et al., "Delivering real-time AI in the palm of your hand," Facebook Caffe2Go, https://code.fb.com/android/delivering-real-time-ai-in-the-palm-of-your-hand/, Nov. 2016 (7 pages in English).
Abadi, M. et al., "TensorFlow: Large-Scale Machine Learning on Heterogeneous Distributed Systems," arXiv:1603.04467v2 [cs.DC] Mar. 16, 2016 (19 pages in English).
Dai, J., et al., "R-FCN: Object Detection via Region-based Fully Convolutional Networks," arXiv:1605.06409v2 [cs.CV] Jun. 21, 2016 (11 pages, in English).
Hubara, I., et al., "Binarized Neural Networks," arXiv:1602. 02505v1 [cs.LG] Feb. 8, 2016 (17 pages, in English).
Ren, S. et al., "Faster R-CNN: Towards Real-Time Object Detection with Region Proposal Networks," arXiv:1506.01497v3 [cs.CV] Jan. 6, 2016 (14 pages in English).
Park, E., et al., "Weighted-Entropy-based Quantization for Deep Neural Networks," Proceedings of the IEEE Conference on Computer Vision and Pattern Recognition (CVPR), Honolulu, HI, USA, Jul. 2017 (9 pages, in English).
Guiașu, Silviu. "Weighted Entropy." *Reports on Mathematical Physics* 2.3 Jan. 15, 1971 (15 pages in English).
Zhou, et al. "Dorefa-Net: Training Low Bitwidth Convolutional Neural Networks with Low Bitwidth Gradients." *arXiv preprint arXiv:1606.06160v2* Jul. 17, 2016. (14 pages in English).
Guiasu, Silviu, "Grouping Data by Using the Weighted Entropy, Journal of Statistical Planning and Inference", 15 (1986), Elsevier Science Publisher B.V., pp. 63-69 (Year: 1986).

* cited by examiner

FIG. 5

```
Algorithm 1 Weight Quantization
─────────────────────────────────────────
 1: function OPTSEARCH(N, w)
 2:     for k=0 to Nw−1 do          ⎫
 3:         i_k ← f_i(w_k)           ⎬──510
                                     ⎭
 4:     s ← sort([i_0, ⋯, i_{Nw−1}])  ──520
 5:     c_0, ⋯, c_N ← initial cluster boundary  ──530
 6:     while S is increased do      ⎫
 7:         for k=1 to N−1 do        ⎪
 8:             for c'_k ∈ [c_{k−1}, c_{k+1}] do  ⎬──540
 9:                 S' ← S with c_0, ⋯, c'_k, ⋯, c_N ⎪
10:                 if S' > S then   ⎪
11:                     c_k ← c'_k   ⎭
12:     for k=0 to N−1 do
13:         l_k ← Σ_{i=c_k}^{c_{k+1}−1} s[i]/(c_{k+1}−c_k)  ──550
14:         r_k ← f_i^{−1}(l_k)      ──560
15:         b_k ← f_i^{−1}(s[c_k])   ──570
16:     b_N ← ∞
17:     return [r_0 : r_{N−1}], [b_0 : b_N]
18: function QUANTIZE (w_n, [r_0:r_{N−1}], [b_0:b_N])  ⎫──580
19:     return r_k for k s.t. b_k ≤ w_n < b_{k+1}      ⎭
```

- $N$: The number of levels
- $N_w$: The number of weights
- $w_n$: Value of n-th weight
- $i_n$: Importance of n-th weight
- $f_i$: Importance mapping function
- $c_i$: Cluster boundary index
- $S$: Overall weighted entropy

FIG. 6

| Algorithm 2 Activation Quantization |
|---|
| function BINARYTOLOGQUANT($a_n$) <br>    return round $\left(\frac{16 \times \log_2 a_n - fsr}{step}\right) + 1$ |
| function LOGQUANTTOBINARY(index) <br>    if index = 0 then <br>       rerurn 0 <br>    else <br>       rerurn $2^{\frac{1}{16} \times (fsr + step \cdot (index - 1))}$ |
| function WEIGHTEDLOGQUANTRELU($a_n$) <br>    if $a_n$ < 0 then <br>       rerurn 0 <br>    level_idx ← BINARYTOLOGQUANT($a_n$) <br>    if level_idx ≤ 0 then <br>       rerurn 0 <br>    else if levle_idx ≥ N − 1 then <br>       rerurn LOGQUANTTOBINARY(N−1) <br>    else <br>       rerurn LOGQUANTTOBINARY(level_idx) |
| function REPRIMPORTANCE(index) <br>    rerurn LOGQUANTTOBINARY(index) |
| function RERATIVEFREQUENCY(index, a) <br>    for k=0 to $N_a$ −1 do <br>       level_idx$_k$ ← BINARYTOLOGQUANT($a_n$) <br>    if index=0 then <br>       return \| {$a_n$ \| level_idx$_n$ ≤ 0} \| <br>    else if index=N−1 then <br>       return \| {$a_n$ \| level_idx$_n$ ≥ N−1} \| <br>    else <br>       return \| {$a_n$ \| level_idx$_n$ = index} \| |

- N: The number of levels
- $N_a$: Total number of activations
- $a_n$: Value of n-th activation
- fsr : Optimal fsr value (integer)
- step : Optimal step value (a multiple of 2)

NEURAL NETWORK METHOD AND APPARATUS

CROSS-REFERENCE TO RELATED APPLICATION

This application is a Continuation Application of U.S. patent application Ser. No. 15/880,690, filed on Jan. 26, 2018, in the U.S. Patent and Trademark Office, which claims the benefit of Korean Patent Application No. 10-2017-0064884, filed on May 25, 2017, in the Korean Intellectual Property Office, the entire disclosures of all of which are incorporated herein by reference for all purposes.

BACKGROUND

1. Field

The present disclosure relates to a neural network method and apparatus.

2. Description of Related Art

Neural networks are specialized computational architectures that typically require a lot of computational operations on complex input data based on trained parameters. Accordingly, such neural network implementations typically require extensive computational and memory resources, as well as extended operational times before results can be available for one or more trained objectives of the corresponding neural network or respective portions of the corresponding neural network. Such requirements may typically limit implementations to expensive non-mobile environments with delayed or non-real time result indications.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor-implemented neural network method includes obtaining a set of floating point data processed in a layer included in a neural network, determining a weighted entropy based on data values included in the set of floating point data, adjusting quantization levels assigned to the data values based on the weighted entropy, and quantizing the data values included in the set of floating point data in accordance with the adjusted quantization levels.

The method may further include implementing the neural network using the quantized data values and based on input data provided to the neural network, and indicating a result of the implementation.

The weighted entropy may be determined by applying a weighting factor based on determined sizes of the data values to a determined distribution of the data values included in the set of floating point data.

The set of floating point data may be a set of activations processed in the layer.

The set of floating point data may be a set of weights processed in the layer.

The set of floating point data may be a set of weights, and the determining of the weighted entropy may include grouping the set of weights into a plurality of clusters, determining respective relative frequencies for each of the grouped clusters by respectively dividing a total number of weights included in each of the grouped clusters by a total number of weights included in the set of weights, determining respective representative importances of each of the grouped clusters based on sizes of weights included in each of the grouped clusters, and determining the weighted entropy based on the respective relative frequencies and the respective representative importances.

The quantizing may include determining respective weights corresponding to the respective representative importances of each of the grouped clusters as a corresponding representative weight for each of the grouped clusters, and quantizing the weights included in each of the grouped clusters respectively into the corresponding representative weight for each of the grouped clusters.

The adjusting may include adjusting the quantization levels assigned to the data values by adjusting boundaries of each of the clusters in a direction that increases the weighted entropy.

The set of floating point data may be a set of activations, and the quantization levels may be assigned using an entropy-based logarithm data representation-based quantization method, where the determining of the weighted entropy may include determining respective relative frequencies for each of the quantization levels by respectively dividing a total number of activations included in each of the quantization levels by a total number of activations included in the set of activations, determining respective data values corresponding to each of the quantization levels as respective representative importances of each of the quantization levels, and determining the weighted entropy based on the respective relative frequencies and the respective representative importances.

The adjusting may include adjusting the quantization levels assigned to the respective data values by adjusting a value corresponding to a first quantization level among the quantization levels and a size of an interval between the quantization levels in a direction of increasing the weighted entropy.

The adjusting may include adjusting a log base, which is controlling of the quantization levels, in a direction that maximizes the weighted entropy.

The obtaining, determining, adjusting, and quantizing may be performed with respect to each of a plurality of layers included in the neural network, with respective adjusted quantization levels being optimized and assigned for each of the plurality of layers.

The method may further include training the neural network based on the quantized data values, and implementing the trained neural network based on input data, and indicating a result of the implementation.

In one general aspect, provided is a computer-readable recording medium storing instructions, which when executed by a processor, cause the processor to implement any one, any combination, or all processes described herein.

In one general aspect, a neural network apparatus includes a processor configured to obtain a set of floating point data processed in a layer included in a neural network, determine a weighted entropy based on data values included in the set of floating point data, adjust quantization levels assigned to the data values based on the weighted entropy, and quantize the data values included in the set of floating point data in accordance with the adjusted quantization levels.

The processor may be further configured to implement the neural network using the quantized data values and based on input data provided to the neural network, and indicate a result of the implementation.

The weighted entropy may be determined by applying a weighting factor based on determined sizes of the data values to a determined distribution of the data values included in the set of floating point data.

The set of floating point data may include a set of activations processed in the layer or a set of weights processed in the layer.

The set of floating point data may be a set of weights, and the processor may be further configured to group the set of weights into a plurality of clusters, determine respective relative frequencies for each of the grouped clusters by respectively dividing a total number of weights included in each of the grouped clusters by a total number of weights included in the set of weights, determine respective representative importances of each of the grouped clusters based on sizes of weights included in each of the grouped clusters, and determine the weighted entropy based on the respective relative frequencies and the respective representative importances.

The processor may be further configured to determine respective weights corresponding to the respective representative importances of each of the grouped clusters as a corresponding representative weight for each of the grouped clusters, and quantize the weights included in each of the grouped clusters respectively into the corresponding representative weight for each of the grouped clusters.

The processor may be further configured to adjust the quantization levels assigned to the data values by adjusting boundaries of each of the clusters in a direction that increases the weighted entropy.

The set of floating point data may be a set of activations, and the quantization levels may be assigned using an entropy-based logarithm data representation-based quantization method, and the processor may be further configured to determine respective relative frequencies for each of the quantization levels by respectively dividing a total number of activations included in each of the quantization levels by a total number of activations included in the set of activations, determine respective data values corresponding to each of the quantization levels as respective representative importances of each of the quantization levels, and determine the weighted entropy based on the respective relative frequencies and the respective representative importances.

The processor may be further configured to adjust the quantization levels assigned to the respective data values by adjusting a value corresponding to a first quantization level among the quantization levels and a size of an interval between the quantization levels in a direction of increasing the weighted entropy.

The processor may be further configured to adjust the quantization levels by adjusting a log base, which is controlling of the quantization levels, in a direction that maximizes the weighted entropy.

The processor may be further configured to perform the obtaining, determining, adjusting, and quantizing with respect to each of a plurality of layers included in the neural network, with respective adjusted quantization levels being optimized and assigned for each of the plurality of layers.

The apparatus may further include a non-transitory memory storing instructions, which when executed by the processor, control the processor to implement the obtaining, determining, adjusting, and quantizing.

Other features and aspects will be apparent from the following detailed description, the drawings, and the claims.

BRIEF DESCRIPTION OF THE DRAWINGS

FIG. 5 is a diagram illustrating an example of an algorithm for quantizing weights according to one or more embodiments;

FIG. 6 is a diagram illustrating an example of an algorithm of an activation quantization according to one or more embodiments;

Figure 1:
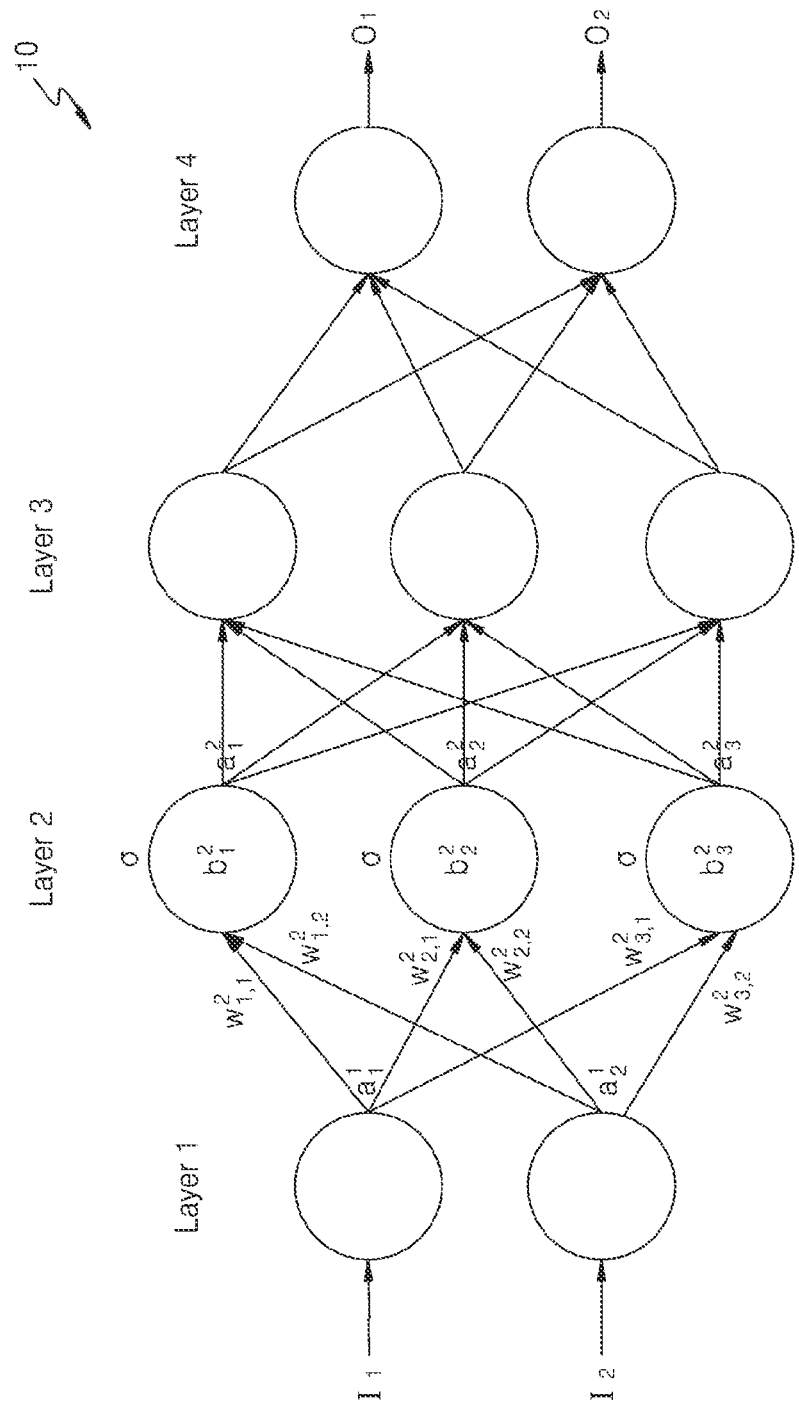
FIG. 1 is a diagram illustrating an example of a neural network according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. For example, as used herein, singular forms are intended to include plural forms as well, unless the context clearly indicates otherwise. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. As further used herein, the term "and/or" includes any and all combinations of one or more of the associated listed items. Expressions such as "at least one of," when preceding a list of elements, modify the entire list of elements and do not modify the individual elements of the list.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "coupled," or "joined" to another component, a third component may be "coupled," and "joined" between the first and second components, although the first component may be directly coupled or joined to the second component. In addition, it should be noted that if it is described in the specification that one component is "directly coupled" or "directly joined" to another component, a third component may not be present therebetween. Likewise, expressions, for example, "between" and "immediately between" and "adjacent to" and "immediately adjacent to" may also be construed as described in the foregoing. The use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

As noted above, typical neural network implementations may require extensive computational and memory resources, as well as extended operational times before results can be available for one or more trained objectives of the corresponding neural network or respective portions of the corresponding neural network. Thus, it is found herein that a technique of efficiently processing neural network operations may be desired to allow neural network implementations to analyze high-definition input data and extract information in real time, such as in low power and/high performance embedded system embodiments, e.g., smart phones, which may have limited resources. Accordingly, one or more embodiments provide and implement techniques that can reduce a computational amount required to process complex input data while also minimizing accuracy loss.

FIG. 1 is a diagram illustrating an example of a neural network 10 according to one or more embodiments.

Referring to FIG. 1, the neural network 10 according to one or more embodiments is illustrated. The neural network 10 may include a structure including an input layer, hidden layers, and an output layer. In an example, the neural network 10 may be represented by one or more processors configured according to the structure. The neural network 10 may be controlled to perform an operation based on received input data (for example, $I_1$ and $I_2$) and generate output data (for example, $O_1$ and $O_2$) based on a result of the operation. As only an example, the example one or more processors may correspond to CPU 1010 or neural network device 1030 of FIG. 10, or processing elements 1032 of FIG. 11, though embodiments are not limited thereto. In an example, the electronic system 100 of FIG. 10 may control operations of reading an input from a memory or capturing the input from a sensor module, such as an image or microphone sensor, and control input of the read/captured input to the neural network 10. In an example, the electronic system 100 may select to implement a quantization method for trained parameters of the neural network 10, for example, such as the below discussed weighted entropy-based quantization methods, and then indicate the result of the implemented neural network 10. The indicating of the result may be made either through explicit or inferential indications. As non-limiting examples, an explicit indication may be a represented display of the electronic system 100 displaying the result, while the inferential indication may include further operations of the electronic system 100 being selectively operated based on the result.

The neural network 10 may be a deep neural network (DNN) or an n-layers neural network including two or more hidden layers. For example, as illustrated in FIG. 1, the neural network 10 may be the DNN including an input layer Layer 1, two hidden layers (a second layer Layer 2 and a third layer Layer 3), and an output layer Layer 4. The DNN may be, or include one or more respective portions corresponding to the same, a convolutional neural network (CNN), a recurrent neural network (RNN), fully connected feed forward neural network, a deep belief network, or a restricted Boltzman machine. However, the DNN is not limited thereto.

When the neural network 10 includes a DNN structure, the neural network 10 may include more layers that can each extract effective information. Thus, the neural network 10 may handle more complex data sets than a conventional neural network with only input and output layers or with only a single hidden layer. The neural network 10 is illustrated as including four layers, but this is only an example, and the neural network 10 may include less or more layers. In addition, the neural network 10 may include layers of various structures different from those illustrated in FIG. 1. Respective configurations of such example neural networks may be stored in a memory of the example electronic system 100, such as through hyper parameters, which when read and implemented by a processor/processing element of the electronic system 100 the neural network 10 is thereby configured.

Each of the layers included in the neural network 10 may include, or be representative of, a plurality of nodes, 'processing elements (PEs)', 'units', or similarly termed elements. For example, as illustrated in FIG. 1, the input layer Layer 1 is illustrated as including two nodes and the second layer Layer 2 is illustrated as including three nodes. However, this is only an example and each of the layers included in the neural network 10 may include various numbers of nodes.

The nodes included in each of the layers included in the neural network 10 may be connected to one another to exchange data. For example, one node may receive data from one or more other nodes and operate on the respective data, and output the results of the respective operations to still other nodes. The example one node may also output the results of the respective operations back to itself, such as in a recurrent connection configuration.

An output value of each of the nodes may be referred to as an activation, e.g., as a result of an example activation function of a corresponding node. The activation may be the output value of one node and, at the same time, an input value for one or more nodes included in a next layer. Each of the nodes may determine its activation based on the activations and weights received from the nodes included in a previous layer, for example. A weight is a parameter defining the neural network and is used for calculating the activation at each node and may be a value assigned to a connection relationship between nodes. For example, each weight may be a trained weight that is a result of a supervised or unsupervised training operation for the neural network. Such weights may also be stored in the example memory of the electronic system 100 of FIG. 10, for example.

Accordingly, each of the nodes may be a computational unit that receives one or more data values and outputs the resultant activation and also may map inputs to outputs. For example, if σ is an activation function, $w_{jk}^{i}$ is a weight from the $k^{th}$ node in the $(i-1)^{th}$ layer to the $j^{th}$ node in the $i^{th}$ layer, and $b_j^i$ is a bias value of the $j^{th}$ layer, and $a_j^i$ is the activation of the $j^{th}$ node in the $i^{th}$ layer, the activation $a_j^i$ may be expressed by the below Formula 1, as only an example.

$$a_j^i = \sigma(\Sigma_k(w_{jk}^i \times a_k^{i-1}) + b_j^i) \quad \text{Formula 1:}$$

As illustrated in FIG. 1, the activation of the first node in the second layer Layer 2, e.g., the illustrated top node of the second layer, may be expressed as $a_1^2$. In addition, $a_1^2$ may have a value of $\sigma(w_{1,1}^2 \times a_1^1 + w_{1,2}^2 \times a_2^1 + b_1^2)$ according to Formula 1. However, the above-described Formula 1 is only an example for describing an example activation and example weights applied in processing data by a node in a layer in the neural network 10, and embodiments are not limited thereto. The activation may be a value obtained by processing through a rectified linear unit (ReLU), performing an example ReLU activation function, a value obtained by applying the activation function to a weighted sum of activations received from the previous layer.

As described above, in the neural network 10, a large number of data sets may be exchanged between a plurality of mutually connected nodes and be subject to a lot of computational processes while passing through the layers. Thus, one or more embodiments demonstrate techniques that may be capable of minimizing accuracy loss while reducing the computational amount required for processing complex input data, e.g., compared to examples where quantization of weights and/or activations is not performed, or compared to the below discussed linear or log quantization operations that may alternatively be performed.

Figure 2:
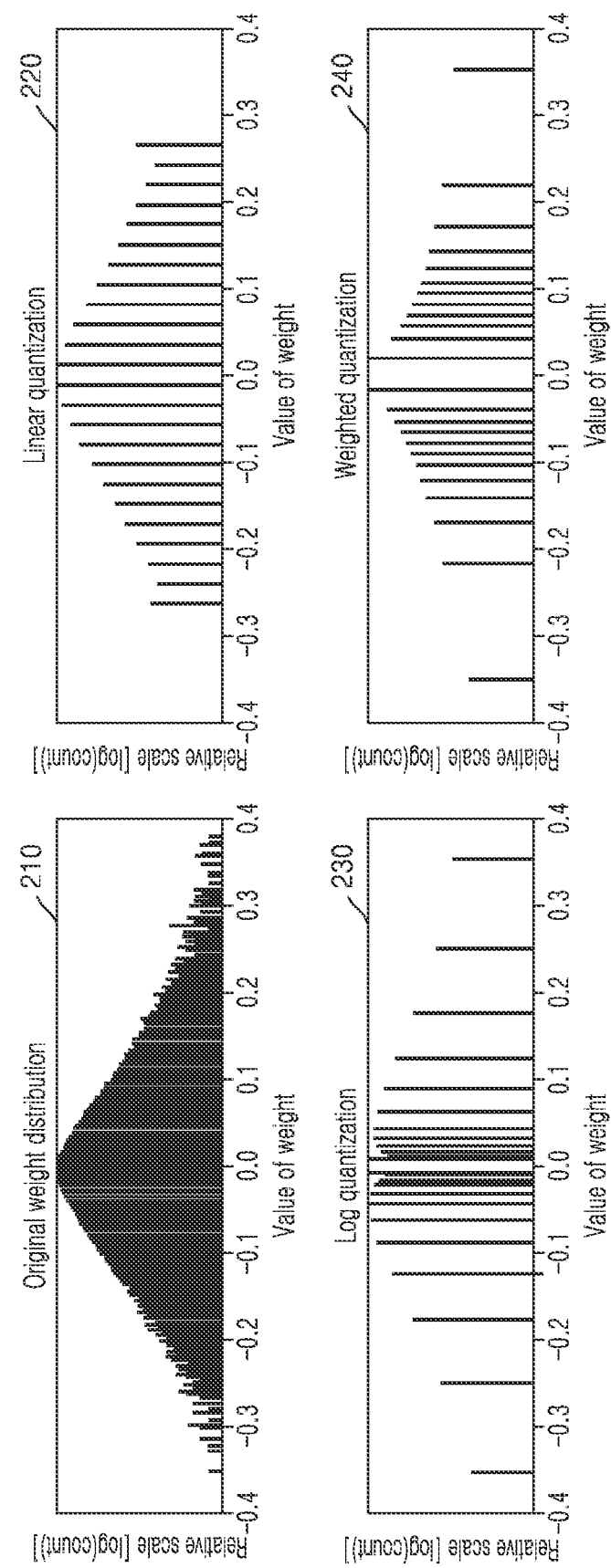
FIG. 2 is a diagram illustrating example distributions of weights processed in layers included in an example neural network according to one or more embodiments and example respective results of various quantization methods applied to the weights.

FIG. 2 is a diagram illustrating example distributions of weights processed in layers included in an example neural network according to one or more embodiments and example respective results of various quantization methods applied to the weights.

FIG. 2 illustrates a distribution 210 of trained weights that may be processed in an example layer included in an example neural network, such as the neural network 10 of FIG. 1, according to an embodiment. In the distribution 210, most of the weights are illustrated as being concentrated near zero, which results in a bell-shaped distribution. The distribution 210 of the weights may vary depending on a shape, configuration, objective, and/or location of each layer. For example, weights in an example neural network having a convolutional layer and/or fully-connected layer may be respectively concentrated near zero with distributions of the respective weights tending to decrease sharply as a size of the weights increase.

Various quantization methods may be implemented in order to reduce a large computational amount needed for processing weights in a neural network. For example, a multi-bit quantization may include implementing a quantization method that reduces the computational amount required for processing weights by quantizing the weights into multi-bits of length smaller than an original bit length of each of the weights, even if an accuracy may be somewhat decreased when the neural network is implemented with the weights to which the multi-bit quantization has been applied. Such multi-bit quantization methods may be implemented, including a linear quantization method, a log quantization method, etc.

For example, the result 220 in FIG. 2 represents quantized weights resulting from application of the linear quantization method, where the linear quantization method may include assigning quantization levels at certain uniform intervals to the weights to produce the quantized weights. Here, the linear quantization method does not consider the distribution of the weights, but rather, the quantization levels are merely assigned at certain uniform intervals, even for weights having large values and very low frequency. Thus, although the quantization levels assigned to the weights by the linear quantization method are limited for somewhat reducing the computational amount in a range of accuracy loss, the linear quantization method may not effectively represent the distribution of weights by using such limited quantization levels.

The result 230 in FIG. 2 represents quantized weights resulting from the application of the log quantization method, with the log quantization method assigning quantization levels based on a logarithmic data representation, thereby assigning relatively less quantization levels for weights having large sizes and assigning relatively more quantization levels for near-zero weights. Here, the log quantization method does not consider the distribution of the weights or data values. Rather, there may be high frequencies of near-zero weights, but since the sizes thereof are small, their influence on a final output may also be minimal compared to the influence on the final output by larger sized weights. Since the log quantization method assigns relatively more quantization levels to the near-zero weights that may have little effect on the final output, and thus, the log quantization method may not effectively represent the distribution of given weights by using the limited quantization levels defined by the log quantization method.

Consequently, in one or more weighted entropy-based quantization method embodiments, not only the distribution of the weights but also respective impacts of each weight or similarly sized weights may be considered. For example, through implementation of an example weighted entropy-based quantization method to weights, less quantization levels may be assigned to the near-zero weights having high frequency and very low output affecting importance, and also less quantization levels may be assigned even to large sized weights having very low frequency and high output affecting importance, while a larger number of quantization levels may be assigned to weights between both extreme ends, e.g., an extreme represented by such near-zero weights and respective positive and negative extremes represented by such large sized weights. Weights to which the larger number of quantization levels may be applied may thus correspond to a region of all weights that has a relatively high frequency and relatively high importance, and thus, the computational amounts required for processing the resultant quantized weights according to such a weighted entropy-based quantization method may be reduced while the accuracy loss due to quantization may also be reduced, e.g., compared to the linear quantization method discussed with respect to the example result 220 and the log quantization method discussed with respect to the example result 230. In such an example weighted entropy-based quantization method, the distribution of the weights may be effectively expressed by using the limited quantization levels, e.g., without requiring the quantization levels to quantize the weights into respective uniform or equal intervals and without requiring the quantization levels to quantize the weights into respective intervals that are fixed according to a preset algorithmic function such as the example log based setting of quantization levels of the log quantization method.

Accordingly, an example result 240 in FIG. 2 may be obtained when such an example weighted entropy-based quantization method is applied. As discussed above, the result 240 demonstrates that less quantization levels may respectively be assigned to each of the near-zero weights and the relatively large weights while more quantization levels may be assigned to the weights between the illustrated example extremes of the weights, e.g., between −0.4 and near 0 and between near 0 and 0.4. For example, the example weighted entropy-based quantization may take into account both the size (importance) and the distribution (frequency) of the weights. In this example, there may be an inferred greater importance on a final result for a weight having a larger absolute value, e.g., size, than a weight having a smaller absolute value. An increased or decreased distribution or frequency of weights respectively correspond to increased or decreased number of weights with like or similar values, for example. Example quantization methods including such a weighted entropy-based quantization method will be described in greater detail further below with reference to FIGS. 3 through 9.

In addition to quantization of weights based on distribution demonstrated in result 240, activations processed in the layers included in the example neural network may also have different distributions, though the activations may always have non-negative values when implemented as ReLU activations, for example. Thus, according to one or more embodiments, example weighted entropy-based quantization methods may take into account both the size (importance) and the distribution (frequency) of the activations and be applied to such activations.

Figure 3:
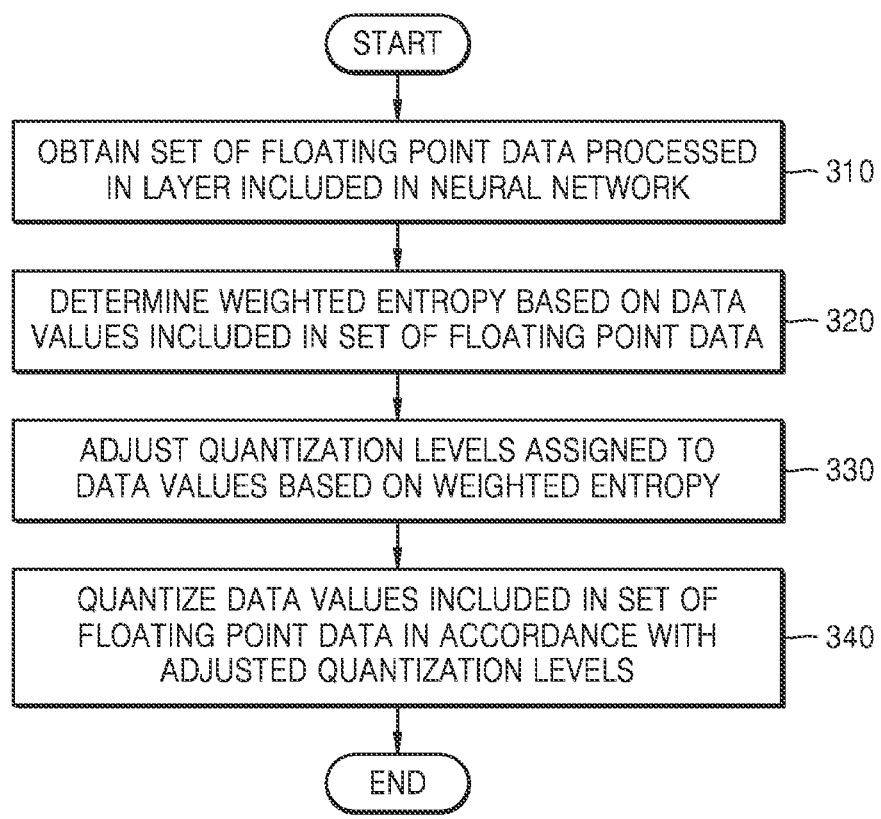
FIG. 3 is a flowchart of a method of quantizing data in an example neural network according to one or more embodiments.

FIG. 3 is a flowchart of a method of quantizing data in an example neural network according to one or more embodiments.

Referring to FIG. 3, in operation 310, a neural network apparatus may obtain a set of floating point data processed in a layer included in the neural network. Such sets of floating point data may include at least one of a set of activations processed in the layer and a set of weights processed in the layer.

For example, the neural network apparatus may obtain a set of weights assigned to a connection relationship between nodes included in the layer and nodes included in a previous layer or a next layer of the layer. The sets of weights may be obtained from a memory of the neural network apparatus, for example. In addition, the neural network apparatus may obtain a set of activations from the previous layer, and also may obtain a set of activations corresponding to the layer based on the set of weights and the set of activations obtained from the previous layer. The set of activations from the previous layer may be obtained from a temporary memory, for example, as stored to upon performing of the activations of the previous layer, or provided directly from the previous layer upon completion of the respective activations of the previous layer. As also noted above, respective activations corresponding to the layer may also be based on obtained bias values, e.g., which may be obtained from a memory the neural network apparatus.

In operation 320, the neural network apparatus may determine a weighted entropy based on the data values included in the set of floating point data. The weighted entropy may be determined by applying a weighting factor based on determined sizes of the data values to a determined distribution of the data values included in the set of floating point data. For example, the weighted entropy may be an indicator that measures an amount of information of a quantized result based on frequencies and sizes of the quantized values. The neural network apparatus may determine the weighted entropy in accordance with a degree according to which the data values included in the set of floating point data are determined to affect output data.

In a method described below, the weighted entropy is determined both for a case where a set of floating point data is the set of weights and for a case where the set of floating point data is the set of activations.

When the set of floating point data is the set of weights, the neural network apparatus may group the set of weights into a plurality of clusters. When it is necessary to classify the weights into N quantization levels, the neural network apparatus may classify each of the weights in accordance with a respective size and map each of the weights into one of N clusters. For example, the neural network apparatus may group the set of weights into N clusters $C_0, \ldots,$ and $C_{N-1}$.

A total number of the plurality of clusters may define or correspond to the total number of limited quantization levels. For example, when it is necessary to quantize the weights into at least 4 bits to keep the accuracy loss in a predetermined acceptable range, the neural network apparatus may group the weights into $2^4$ clusters. In this case, the number $2^4$ is only an example and the number of clusters may be adequately determined so as to sufficiently reduce the computational amount in a predetermined allowable accuracy loss range. Alternatively, the number of clusters may be determined by the neural network apparatus through one or more layers configured to perform the determination or by a user input.

The neural network apparatus may determine a relative frequency of each of the grouped clusters by dividing the number of weights included in each of the grouped clusters by the total number of the weights included in the set of weights. For example, when the neural network apparatus groups the set of weights into N clusters $C_0, \ldots,$ and $C_{N-1}$, the relative frequency $P_n$ of the $n^{th}$ cluster may be defined by the below Formula 2, as only an example.

$$P_n = \frac{|C_n|}{\sum_k |C_k|} \quad \text{Formula 2}$$

In Formula 2, $|C_n|$ may denote the total number of the weights included in the $n^{th}$ cluster and $\Sigma_k |C_k|$ may denote the total number of the weights included in all clusters.

In addition, the neural network apparatus may determine a representative importance of each of the grouped clusters based on the sizes of the respective weights included in each of the grouped clusters. The term "importance" may be a determined weighting factor based on the sizes of the data values of a grouped cluster, for example, and may be a mathematical representation of respective effects of the weights of the grouped cluster on the final output. For example, the importance of $i_{(n,m)}$ of an $m^{th}$ weight included in the $n^{th}$ cluster may be calculated by the below Formula 3, as only an example.

$$i_{(n,m)} = f(w_{(n,m)}) = w_{(n,m)}^2 \quad \text{Formula 3:}$$

In Formula 3, $f(w_{(n,m)})$ may be a function representing a relationship between the corresponding weight and the corresponding importance for the $m^{th}$ weight included in the $n^{th}$ cluster, and $w_{(n,m)}$ may be the size of the $m^{th}$ weight included in the $n^{th}$ cluster. As shown in Formula 3, the importance may be quadratically proportional to the size of the weight. The relationship between the importance and the size of the weight according to Formula 3 may be only an example, and embodiments are not limited thereto.

In addition, the neural network apparatus may determine representative importance of each of the grouped clusters based on values of the importance corresponding to the weights included in each of the grouped clusters. For example, the representative importance $I_n$ of the $n^{th}$ cluster may be defined by the below Formula 4, as only an example.

$$I_n = \frac{\sum_m i_{(n,m)}}{|C_n|} \quad \text{Formula 4}$$

In Formula 4, $\Sigma_m i_{(n,m)}$ may denote a sum of the importance corresponding to each of the weights included in the $n^{th}$ cluster, and $|C_n|$ may denote the total number of weights included in the $n^{th}$ cluster. As shown in Formula 4, the representative importance may be an average value of all importances corresponding to the weights included in the cluster.

The neural network apparatus may determine respective weights corresponding to the representative importance of each of the grouped clusters, e.g., as respective representative weights of each of the grouped clusters, and quantize each of the weights included in each of the grouped clusters into the corresponding representative weight of each of the grouped clusters. For example, the neural network apparatus may quantize $f^{-1}(I_n) = \sqrt{I_n}$ that is a weight corresponding to the representative importance of the $n^{th}$ cluster or $I_n$ into the representative weight of the $n^{th}$ cluster.

The neural network apparatus may determine the weighted entropy based on the relative frequency and the representative importance. The neural network apparatus may determine the weighted entropy of the grouped clusters based on the relative frequency and the representative importance of each of the grouped clusters. For example, the weighted entropy S of N-grouped clusters may be defined by the below Formula 5, as only an example.

$$S = -\Sigma_n I_n P_n \log P_n \quad \text{Formula 5:}$$

In Formula 5, the $I_n$ may denote the representative importance of the $n^{th}$ cluster and the $P_n$ may denote the relative frequency of the $n^{th}$ cluster. As shown in Formula 5, the weighted entropy may be determined by applying a weighting factor based on the sizes of the weighted values to the distribution of the weighted values.

As described above, the neural network apparatus may determine the weighted entropy of the set of weights based on a clustering-based quantization method. However, unlike an example implementation where the weights are fixed after training, the activations may vary in accordance with the input data in an inference process implementing the neural network, or respective process of a trained objective of a layer or layers of the neural network, and thus, it may be difficult to determine the weighted entropy of the activations based on a same clustering entropy-based quantization method. Accordingly, in an example, an entropy-based log quantization method may be applied, e.g., instead of the clustering entropy-based quantization method, to the activations.

The entropy-based log quantization method may be a method of quantizing data values into an optimized log domain. For example, when the activation x is log quantized, the below Formula 6 may be applied, as only an example.

$$LogQuant(x, \text{bitwidth}, FSR) = \begin{cases} 0, & x = 0 \\ 2^{\tilde{x}}, & \text{otherwise} \end{cases} \quad \text{Formula 6}$$

In Formula 6, the LogQuant may denote a logarithm-based quantization, the bitwidth may denote a bit length set to represent a desired quantized value, and the FSR or full scale range may denote an offset parameter for controlling a change in a range of activations.

The term $\tilde{x}$ in Formula 6 may be defined by the below Formula 7, as only an example.

$$\tilde{x} = \text{Clip}\left(\text{Round}(\log_2(|x|)), FSR - 2^{\text{bitwidth}}, FSR\right), \quad \text{Formula 7}$$

$$\text{Clip}(x, \min, \max) = \begin{cases} 0, & x \leq \min \\ \max - 1, & x \geq \max \\ x, & \text{otherwise} \end{cases}$$

In Formula 7, the Clip(x,min,max) may denote a function that outputs 0 when x≤min 0, max−1 when x≥max, and x when min<x<max, and the Round may denote a function that performs rounding. Thus, according to Formula 7, $\tilde{x}$ may have a value of 0 when Round($\log_2(|x|)$)≤FSR−$2^{\text{bitwidth}}$, FSR−1 when Round($\log_2(|x|)$)≥FSR, and Round ($\log_2(|x|)$) when FSR−$2^{\text{bitwidth}}$<Round($\log_2(|x|)$)<FSR.

As a result, a non-zero x may be quantized into a value of 1 when Round($\log_2(|x|)$)≤FSR−$2^{\text{bitwidth}}$, $2^{FSR-1}$ when Round($\log_2(|x|)$)≥FSR, and $2^{\text{Round}(\log_2(|x|))}$ when FSR−$2^{\text{bitwidth}}$<Round($\log_2(|x|)$)<FSR. In the case where the FSR is 5 and the bitwidth is 3, the weights may be quantized into 0, $2^{-2}$, $2^{-1}$, $2^0$, $2^1$, $2^2$, $2^3$, and $2^4$.

The entropy-based log quantization method may thus represent a set of various activations by optimally adjusting a size of a value corresponding to the first quantization level among the quantization levels and an interval size between the quantization levels, even if the activation fluidly varies according to the input data.

For example, the neural network apparatus may determine the relative frequency of each of the log quantization levels by dividing the total number of the activations included in each of the log quantization levels by the total number of activations included in the set of activations. For example, in the example describe above, the neural network apparatus may determine the relative frequency of a quantization level of $2^2$ by dividing the number of activations quantized into $2^2$ by the total number of activations included in the set of activations, e.g., for a layer of the neural network.

In addition, the neural network apparatus may determine the data value corresponding to each of the log quantization levels as the representative importance of each of the log quantization levels. For example, in the example described above, the neural network apparatus may determine the representative importance of the log quantization level of $2^2$ to be $2^2$.

The neural network apparatus may determine a weighted entropy for the set of activations based on the relative frequency and the representative importance of each of the log quantization levels. The weighted entropy of the set of activations quantized into N log quantization levels may be determined according to Formula 5 described above. As discussed below, an optimal log base may be determined where entropy of the set of activations is maximized, for example.

Thus, in operation 330, the neural network apparatus may adjust quantization levels assigned to the data values based on such weighted entropies to maximize each weighted entropy. For example, when the data values included in a floating-point data set are weights and quantized so as to maximize the weighted entropy of the floating-point data set, less quantization levels may be assigned to the near-zero weights having a high frequency but very low importance among the data values included in the floating-point data set, and less quantization levels may also be assigned to large weights having high importance but a very low frequency.

In other words, when data values included in a floating-point data set are quantized so that the corresponding weighted entropy of the floating-point data set is maximized, a large number of quantization levels are assigned to an interval or region between both extreme ends of the respective floating-point data set, i.e., in the interval or region where the corresponding frequencies and importances are moderately large. With such weighted entropy-based quantization approaches, computational amounts required to process such data values may be reduced while the corresponding accuracy loss is minimized, e.g., compared to implementation examples where quantization of such data values is not performed, or compared to where merely linear or non-entropy-based log quantization is performed. Thus, the neural network apparatus may adjust the quantization levels assigned to the data values so as to maximize the weighted entropy.

For example, when the set of floating point data is the set of weights, the neural network apparatus may thus adjust the quantization levels assigned to the data values by adjusting boundary values of each of the clusters in a direction of increasing the weighted entropy. The weighted entropy may thereby be changed as the boundary values of each of the clusters are adjusted, such as described in greater detail below with reference to FIG. 4.

Figure 4:
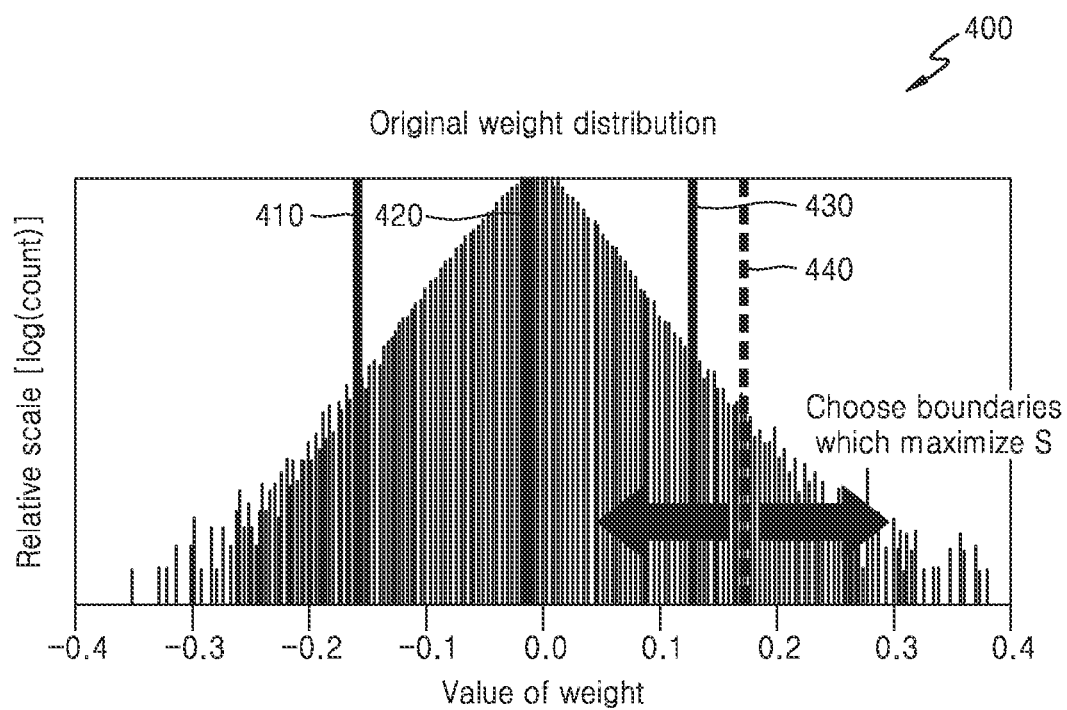
FIG. 4 illustrates a process of adjusting a boundary value of a cluster to increase weighted entropy according to one or more embodiments.

FIG. 4 illustrates a process of adjusting the boundary value of a cluster to increase the weighted entropy according to one or more embodiments.

Referring to FIG. 4, four cluster boundary values 410, 420, 430, and 440 are shown with a distribution of the weights. The set of weights may be divided into a total of five clusters by the cluster boundary values 410, 420, 430, and 440. As shown in FIG. 4, when the boundary value 440 moves while the remaining boundary values 410, 420, and 430 are maintained, the weights included in a fourth and a fifth clusters may respectively change. Thus, the relative frequency and the representative importance of each of the fourth and fifth clusters may also respectively be changed, and subsequently, the weighted entropy of all the clusters may be changed.

The neural network apparatus may find a location of the boundary value 440 at which the weighted entropy is maximized by moving the boundary value 440 while maintaining remaining boundary values 410, 420, and 430. In addition, the neural network apparatus may find the boundary values of clusters that maximize the weighted entropy by repeating the same procedure for each of the other boundary values, e.g., until entropy is maximized.

Referring back to FIG. 3, when the set of floating point data is the set of activations, the neural network apparatus may adjust the quantization levels assigned to the data values, such as according to the entropy-based log quantization method, by adjusting the value corresponding to the first quantization level among the quantization levels in the direction of increasing the weighted entropy and the value of the interval between the quantization levels. Thus, from these descriptions of FIGS. 3 and 4, it should be understood that the weighted entropy may thereby be changed as the value corresponding to the first quantization level, for example, among the quantization levels and the value of the interval between the quantization levels are adjusted, and thus, further detailed descriptions thereof will be omitted.

Returning to FIG. 3, in operation 340, the neural network apparatus may quantize the data values included in the corresponding set of floating point data in accordance with the corresponding adjusted quantization levels. As described above, since the neural network apparatus adjusts the quantization levels assigned to the data values so as to maximize the weighted entropy, the data values may be quantized so as to minimize the accuracy loss due to quantization while the computational amount required to process the data values is reduced, as discussed above.

The neural network apparatus may assign optimized quantization levels to each of a plurality of layers by repeating the above-described process for each of the plurality of layers included in the neural network. If the above-described process is repeatedly performed for each of the plurality of layers included in the neural network, the adjusted quantization levels may be optimized for each of the plurality of layers. Since the distribution of the weights or the activations may be different according to a type and a location of each layer, the neural network apparatus may assign respective optimized quantization levels to each of the plurality of layers included in the neural network.

In an example, the neural network apparatus may also train the neural network with such quantized data values and thereafter infer the output data from input data by using the neural network trained based on the quantized data values of based on the training determined optimum quantization levels. In an example where the neural network apparatus performs training of the neural network with quantized data values according to the weighted entropy quantization method, the neural network apparatus may not implement such weighted entropy quantization also when implementing the corresponding trained neural network for input data, such as captured input data. In an example, when the neural network is not trained with such weighted entropy quantization the weighted entropy quantization may be implemented when implementing the neural network with trained weights, e.g., non-weighted entropy quantized weights, to infer the output data from the quantized data. Similarly, when the neural network is not trained with such weighted entropy quantization, weighted entropy quantization of the non-weighted entropy quantized weights of the trained neural network may be implemented any time before implementing the neural network, which is then implemented using the weighted entropy quantized weights. Likewise, in an example, weighted entropy quantization of activations may be implemented during training of the neural network or otherwise before or during implementation of a trained neural network.

In an embodiment, for weights or activations originally, e.g., in such non-weighted entropy quantization states, having 16-bit or 32-bit floating point values, the neural network apparatus may represent quantizations of such weights and/or activations via respective weighted entropy-based quantization methods as highly effective quantization levels among limited quantization levels (e.g., as quantization levels each capable of being represented with 4-bits in an example and non-limiting embodiment).

A weighted entropy-based quantization method according to one or more embodiments may result a significant reduction in computational amount and a model size with minimum accuracy loss, and also may adequately utilize an accuracy-performance trade-off via a multi-bit quantization, compared to the aforementioned non-quantization implementations, linear quantization method, and typical non-weighted entropy log quantization method. In addition, according to a weighted entropy-based quantization method according to one or more embodiments, it may be possible to quantize an entire neural network, e.g., including hidden, input, and output layers, without further modifications of the neural network.

FIG. 5 is a diagram illustrating an example of an algorithm for quantizing weights according to one or more embodiments.

FIG. 5 illustrates an example of an algorithm 1 50 for performing weighted entropy-based quantization on non-negative weights. For example, weighted entropy-based quantization may be separately performed on the non-negative weights and negative weights. However, the embodiment is not limited thereto. The neural network apparatus may perform the weighted entropy-based quantization on the weights by using the algorithm 1 50 shown in FIG. 5. Also, as an example, any or any combination of the one or more processors or processing elements discussed herein may implement the algorithm 1 50, for example, before or during implementation of the corresponding neural network.

For example, in operation 510, the neural network apparatus may calculate the importance of each of obtained weights, e.g., obtained from a memory of the neural network apparatus. Computation of the importance may be performed by an importance mapping function, e.g., by the one or more processors or processing elements, that calculates the importance from weight(s).

After the neural network apparatus has acquired the importance values of all the weights, the neural network apparatus may sort the importance values in an ascending order of magnitude in operation 520. The neural network apparatus may obtain an array s by sorting the importance values in an ascending order of magnitude.

In operation 530, the neural network apparatus may initialize cluster boundary value indices $c_0, \ldots, c_N$, based on the sorted importance values. The cluster boundary value index may be an index for determining which weights are included in which clusters. A cluster $C_i$ may be defined as including $c_i^{th}$ weight up to $(c_{i+1}-1)^{th}$ weight of the array s.

In an embodiment, the neural network apparatus may initialize the cluster boundary value indices or $c_0, \ldots, c_N$, based on the sorted importance values, as only an example, so that 1) each cluster has the same number of weights and 2) the weights included in $C_{i+1}$ have higher importance than the weights included in $C_i$. Initialization of the cluster boundary value index may be performed by partitioning the sorted array s into N pieces. For example, when s=[1,2,3,4] and N=2, and when cluster boundary value indices are set as $c_0=2$ and $c_1=4$, the clusters may be partitioned to $C_0=\{1, 2\}$ and $C_1=\{3, 4\}$.

In operation 540, the neural network apparatus may perform an incremental search with respect to new cluster boundary values by starting from initial cluster boundary values. The neural network apparatus may search for $c_i$, a cluster boundary candidate which allows the clusters to have a higher weighted entropy by changing $c_i$ from to $c_{i+1}$ for each cluster $C_i$ having the cluster boundary values $c_i$ and $c_{i+1}$.

In operation 550, the neural network apparatus may calculate a representative importance $I_k$ of each cluster $C_k$ after obtaining a new cluster boundary value. In addition, in operation 560, the neural network apparatus may obtain representative weight $r_k$ of the cluster $C_k$.

In operation 570, the neural network apparatus may determine $b_k$, which are weights at cluster boundaries for identifying which weights are included in which cluster. For example, the cluster $C_i$ may include weights satisfying $b_k \leq w < b_{k+1}$.

In operation 580, the neural network apparatus may quantize a weight $w_n$ satisfying $b_k \leq w_n < b_{k+1}$ into the representative weight $r_k$. As described above, in one or more embodiments, a quantization result may be optimized by using the weighted entropy-based quantization method that maximizes the entropy while considering the importance of the data. For example, near-zero values may be grouped into a large cluster due to their respective low importances, and relatively large values may be grouped into clusters that include a wide range of weights due to the respective very low frequencies thereof.

It will be apparent to those skilled in the art that the foregoing operations are discussed in no particular order, but may merely be implemented in various orders as long as the order perform weighted entropy-based quantization to the weights as discussed herein.

FIG. 6 is a diagram illustrating an example of an algorithm 2 60 of an activation quantization according to one or more embodiments.

Referring to FIG. 6, an example of the algorithm 2 60 for performing an example weighted entropy-based quantization with respect to activations is illustrated. The neural network apparatus may perform the weighted entropy-based quantization with respect to the activations by using the algorithm 2 60 in FIG. 6. For example, any or any combination of the one or more processors or processing elements discussed herein may implement the algorithm 2 60, for example, before or during implementation of the corresponding neural network.

For example, in operation 610, the neural network apparatus may change a binary data value to a log scale index value. In order to improve an overall accuracy and stability in a process of quantization at a log level, a log base having a small value and an offset having a small value may be selected by the neural network apparatus. As a non-limiting example, and noting that alternatives are available, the neural network apparatus may select the log base to be ⅛ or multiples thereof and select the offset to be ¹⁄₁₆ or multiples thereof. The log base and the offset may respectively correspond to 'step' and 'fsr' in the algorithm 2 60. The log base or the 'step' may denote a parameter for setting a size of an interval between log levels, and the offset or the 'fsr' may denote a parameter for setting a location where a first log level starts.

In operation 620, the neural network apparatus may assign the quantization levels to the log scale index values. For example, the neural network apparatus may assign a value of zero to the first quantization level and corresponding values to other quantization levels. For example, when a 3-bit activation quantization is performed, the value of zero may be assigned to the first quantization level, $$2^{\frac{fsr}{16}}$$

may be assigned to a second quantization level, $$2^{\frac{fsr+step}{16}}$$

may be assigned to a third quantization level . . . , and a value corresponding to an eighth quantization level may be assigned in the same manner.

In operation 630, the neural network apparatus may insert the log scale index value in a ReLU activation function. The ReLU activation function may assign a quantization level having a value of zero to the negative activations and assign quantization levels to activations corresponding to the log scale index values of equal to or less than zero. A quantization result may be more simplified by the ReLU activation function.

In operation 640, the neural network apparatus may determine the activation corresponding to each of the log quantization levels as the representative importance of each of the log quantization levels. The neural network apparatus may determine the activation corresponding to each of the log scale index values as the representative importance of each of the log quantization levels corresponding to each of the log scale index values.

In operation 650, the neural network apparatus may determine the relative frequency of each of the log quantization levels based on the number of activations included in each of the log quantization levels. For example, the neural network apparatus may determine the relative frequency of each of the log quantization levels by dividing the total number of activations included in each of the log quantization levels by the total number of activations included in the set of activations.

The neural network apparatus may determine the weighted entropy for the activations based on the representative importance and the relative frequency determined in operations 640 and 650. The determination of the weighted entropy based on the representative importance and the relative frequency may be performed in accordance with Formula 5 described above, for example. The neural network apparatus may then optimize the quantization result by searching for the 'fsr' and the 'step' which maximize the weighted entropy.

It will be apparent to those skilled in the art that the foregoing operations are discussed in no particular order, but may merely be implemented in various orders as long as the order performs the weighted entropy-based quantization to the activations as discussed herein.

Figure 7:
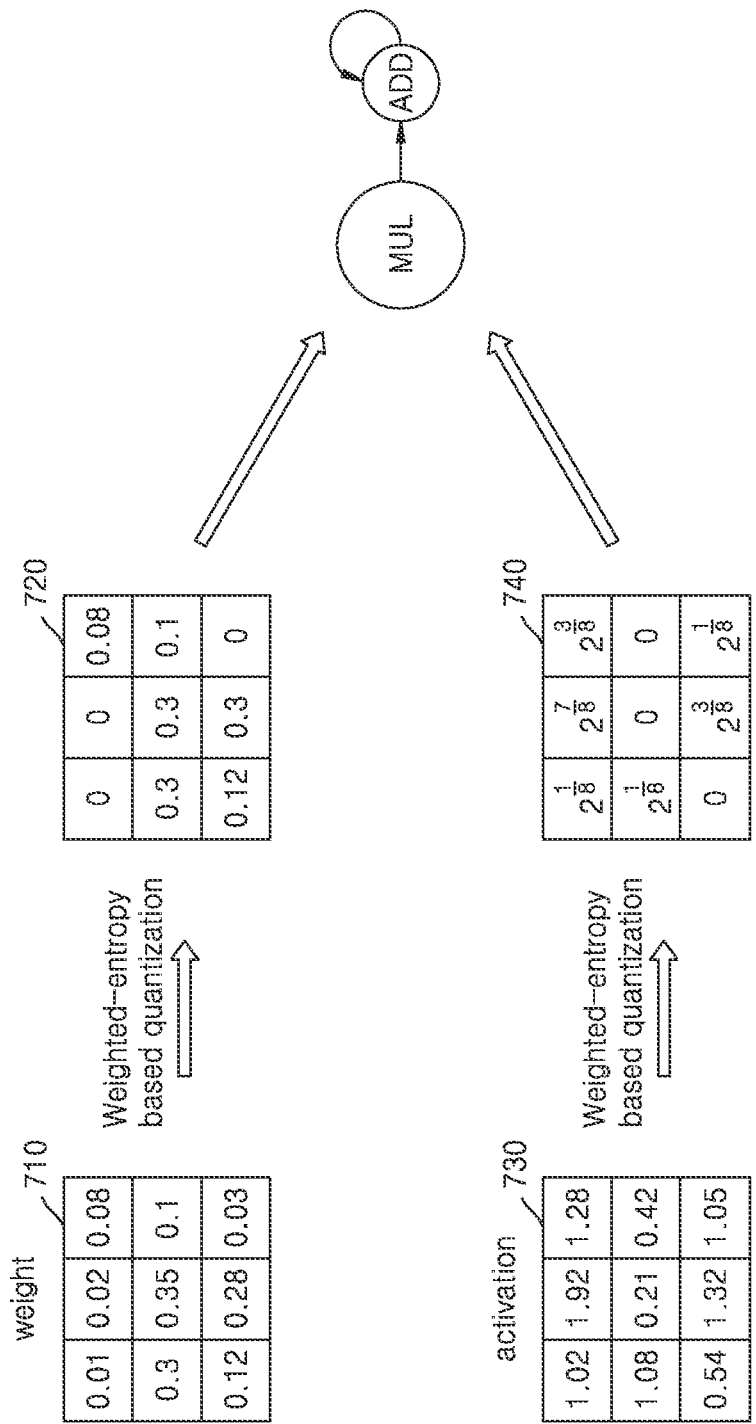
FIG. 7 shows diagrams illustrating an example of results of performing weighted entropy-based quantization to weights and activations according to one or more embodiments.

FIG. 7 shows diagrams illustrating an example of results of performing weighted entropy-based quantization with respect to weights and activations according to one or more embodiments.

Referring to FIG. 7, weights 710 may be quantized by using a weighted entropy-based quantization method as discussed above. The weights 710 may have a vector or matrix structure. For example, as illustrated in FIG. 7, the weights 710 may have a 3×3 matrix structure.

Referring to a quantized result 720, it may be seen that weights of about 0.01, about 0.02, and about 0.03 have all been quantized to about 0. In general, many weights may be near-zero values. However, since the influence of each of the near-zero values on the final output is small, a small number of quantization levels may be assigned to the near-zero values. As a result, in the example of FIG. 7, the weights of about 0.01, about 0.02, and about 0.03 may all be quantized to the same zero value.

In addition, referring to the quantized result 720 again, it may be seen that the weights of about 0.28, about 0.3, and about 0.35 are all quantized to about 0.3. In consideration of a general distribution of the weights, the weights of about 0.28, about 0.3, and about 0.35 may correspond to relatively large values among the all of the weights. Since relatively large values may have a large effect on the final output, with the frequencies thereof being very small, a small number of quantization levels may be assigned to these relatively large values. As a result, the weights of about 0.28, about 0.3, and about 0.35 may all be quantized to the same 0.3 value.

On the other hand, referring to the quantized result 720 again, each of the weights of about 0.08, about 0.1, and about 0.12 have been respectively quantized to about 0.08, about 0.1, and about 0.12, e.g., according to their respective quantization levels. Thus, in consideration of the general distribution of all of the weights, the weights of about 0.08, about 0.1, and about 0.12 may each correspond to an interval between both extreme ends, i.e., between those values very close to zero and those values that have relatively large sizes, wherein both the respective frequencies and importances of the weights of about 0.08, about 0.1, and about 0.12 are fairly large. When a large number of quantization levels are assigned in such an interval where both the respective frequencies and importances are fairly large, a computational amount required for processing the resultant quantized weights may be reduced while the accuracy loss due to the quantization is minimized, as discussed above. Since the weights of about 0.08, about 0.1, and about 0.12 are included in the example interval where both the frequency and importance are fairly high, a larger number of quantization levels are assigned thereto than for those weights near zero or those weights that have relatively large sizes, so each of the weights of about 0.08, about 0.1, and about 0.12 may be each quantized to corresponding quantization levels corresponding to 0.08, 0.1, and 0.12, respectively.

In addition, activations 730 may be quantized by using a weighted entropy-based quantization method. The activations 730 may have a vector or matrix structure. For example, as illustrated in FIG. 7, the activations 730 may have a 3×3 matrix structure. In an example, the activations 730 may be activation results from a previous layer, for example.

Referring to a quantized result 740, the activations 730 may be quantized into about 0, about 2⅛, about 2⅜, and about 2⅞ on a logarithmic scale. The quantized result 740 may be determined so that the weighted entropy is maximized based on the distribution and a size of the activations 730.

Thereafter, the neural network apparatus may implement computation of the layer of the neural network by using the quantized weights and the quantized activations. Because of the use of the quantized weights and the quantized activations, one or more corresponding embodiments may significantly reduce the computational amount compared to case wherein computation is performed with respect to full-precision values, e.g., with respect to weights and activations that have not been quantized, for example.

Figure 8:
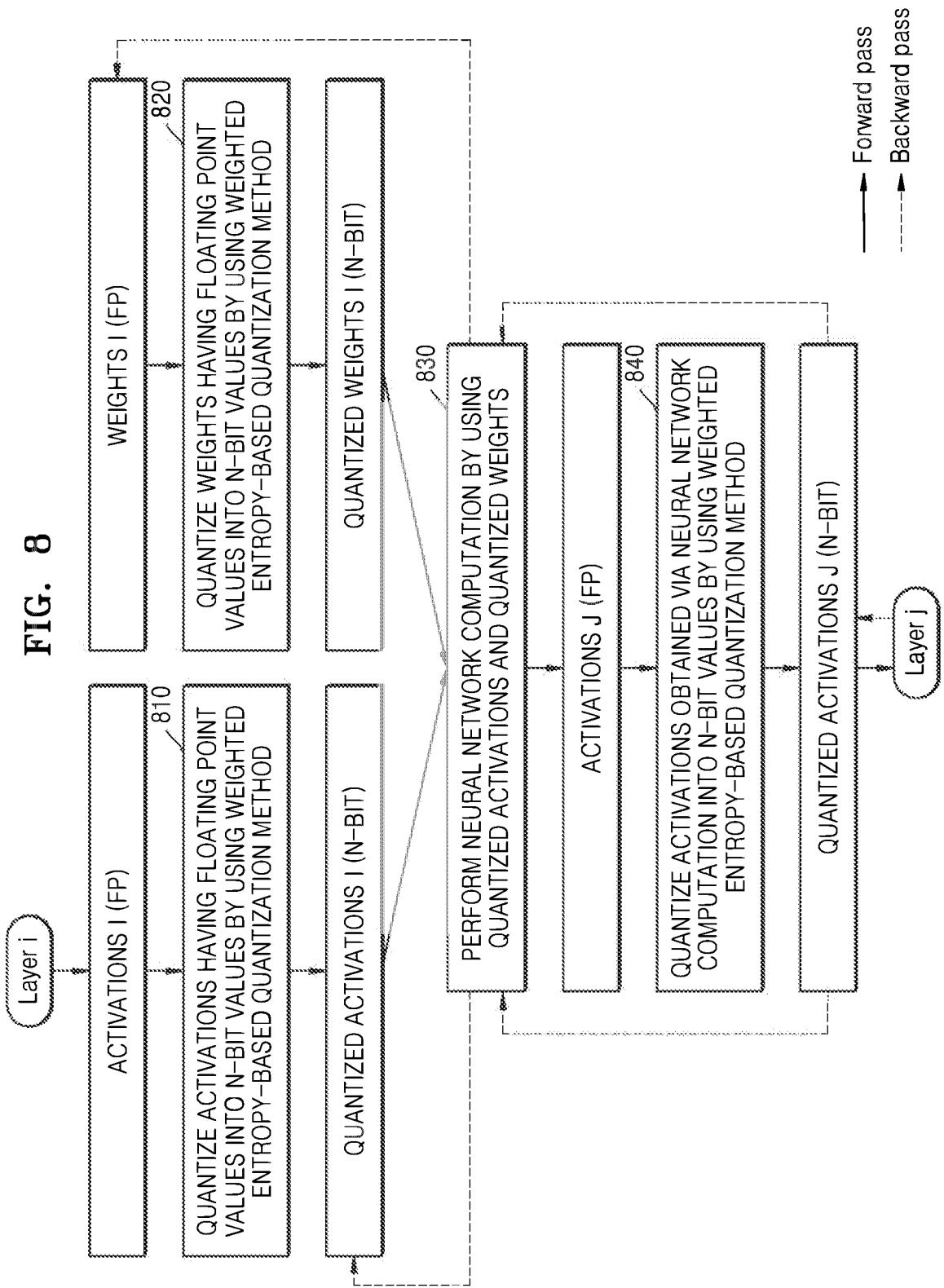
FIG. 8 is a flowchart illustrating a method of operating an example neural network apparatus according to one or more embodiments.

FIG. 8 is a flow chart illustrating a method of operating an example neural network apparatus in accordance with one or more embodiments.

FIG. 8 illustrates an example on how the neural network apparatus operates in a forward pass and a backward pass. A case where the neural network apparatus operates in the forward pass is indicated by a solid line arrow and another case where the neural network apparatus operates in the backward pass is indicated by a dotted line arrow.

Operations of the neural network apparatus may be largely divided into a learning process and an inference process. Herein, for example, the learning process may be a process where the neural network is being trained, such as based on training data, and weights are repetitively adjusted until the neural network is trained to a predetermined level or accuracy for one or more objectives, while the inference process may be considered to correspond to the implementation of such a trained neural network, such as based on non-training data or data captured by the neural network apparatus, as only an example. Thus, the learning process of the neural network apparatus may include both the forward pass and the backward pass, e.g., to implement a back-propagation training process to perform the repetitive adjustments of the weights for the desired objective of the neural network or of respective layers until the neural network or respective layers are trained to a predetermined success rate or otherwise determined training completion, while the inference process may include only such a forward pass.

In an example, when a neural network apparatus performs a learning process, the trained weights and the corresponding activations may be generated in full-precision, e.g., without quantization. For example, when weights are generated with 32-bit floating point values, the weights may be stored as 32-bit floating point values.

When the neural network apparatus performs the forward pass, in either the training or the inference implementation, when performing computations of a current layer the neural network apparatus may obtain the respective activations from another Layer i, for example, or from the same layer at a previous time when the neural network layer is a recurrent layer. The Layer i may be an arbitrary layer included in the neural network apparatus. In addition, the neural network apparatus may obtain stored weights based on previous learning results. For example, during the training process, there may be several forward passes performed for several training data followed by a backward pass where training weights are adjusted to refine the training of the neural network, until the neural network is trained. Also, when a trained neural network is implemented, the forward pass may similarly be implemented, but the input may not be training data and the weights may be the resultant trained weights or previously determined quantizations of the trained weights according to one or more weighted entropy quantization methods discussed herein. As noted, such weighted entropy quantization methods may also be implemented in either of the training process or the inference or implementation process.

Thus, for example, in operation 810, the neural network apparatus may quantize the activations having the floating point values into n-bit values by using a weighted entropy-based quantization method according to one or more embodiments. The weighted entropy-based quantization method has been described above with reference to FIG. 2 to FIG. 7, and thus, a further detailed description thereof will be omitted for brevity purposes. The neural network apparatus may also determine the log base and the offset for an optimal entropy-based quantization of the activations and may quantize the activations by using the determined log base and the determined offset.

In operation 820, the neural network apparatus may quantize the weights, which have floating point values, to n-bit values by using a weighted entropy-based quantization method according to one or more embodiments. For example, the neural network apparatus may determine the cluster boundary values for optimal quantization of the weights and may quantize the weights by using determined cluster boundary values, e.g., through maximization of the corresponding weighted entropy.

In operation 830, the neural network apparatus may perform a neural network operation based on the quantized activations and the quantized weights. The neural network operation may mean applying the activation function to a weighted sum based on the activations and the weights. In addition, the neural network operation may pass the output value of the activation function through an example ReLU function. Since the neural network apparatus performs computation by using weighted entropy quantized data values in accordance to one or more embodiments, the amount of computation may be reduced, as discussed above.

In operation 840, the neural network apparatus may quantize the activation obtained via a neural network computation to an n-bit value by using the weighted entropy quantization method. The quantized activation may be input to a next layer, Layer j.

The above-described operations may be repeatedly executed for each layer included in the neural network. The input data may be calculated in accordance with the operations described above while passing through a plurality of layers included in the neural network and useful information may be extracted from the input data based on the result of the operations.

In the example where the weighted entropy quantization is implemented during the training process, the neural network apparatus may train the neural network by performing the quantization to data sets and forwarding the quantized data sets forward through the neural network.

When the neural network apparatus operates in the backward pass during the training process, the operation in the backward pass may correspond to the aforementioned back propagation process included in the learning process to recursively revise the neural network until the neural network is trained to a predetermined level. As noted, the back propagation may correspond to a process of updating existing weights and activations derived during the forward pass operations to gradually reduce errors during the learning process of the neural network. When the back propagation of the activations is executed, the quantized result of the activations may be updated. Thus, a computation amount generated in the back propagation process may also be reduced.

However, since an amount of change of the weights is relatively smaller than that of the activations during the back propagation process, the errors generated in the learning process may not be reduced when the quantized result of the weights is updated. Thus, in an example, when the back propagation of the weights is executed, original values of the weights may be directly updated, e.g., as stored in full precision rather than as the quantized results of the weights, then the updated weights may be quantized when the next forward pass in the training process is performed.

When weights have been quantized during the training process, the neural network apparatus may perform the inference process by applying the quantized data sets to the trained neural network for input data, such as data captured by sensors of the neural network apparatus. Since the distribution of the weights does not change when the inference process is performed, the stored full precision weights may alternatively be quantized before or during the inference process based on entropy-based optimal clusters or quantization levels determined in a last learning phase. Also, though in the case of the activations the corresponding distributions of activations may continuously change in accordance with the input data, a cost of finding a new entropy-based optimal point in every inference process may be high. Thus, the activations may also be quantized by using an entropy-based optimal log base and an entropy-based optimal offset determined in the last learning operation. However, this may be merely an example and the neural network apparatus may find the new entropy-based optimal point in every inference process. Also, as discussed above, such weighted entropy quantizations of full precision weights and activations may be determined and applied during the inference process even if the aforementioned distribution and importance based quantizations were not implemented during the training of the neural network.

Figure 9:
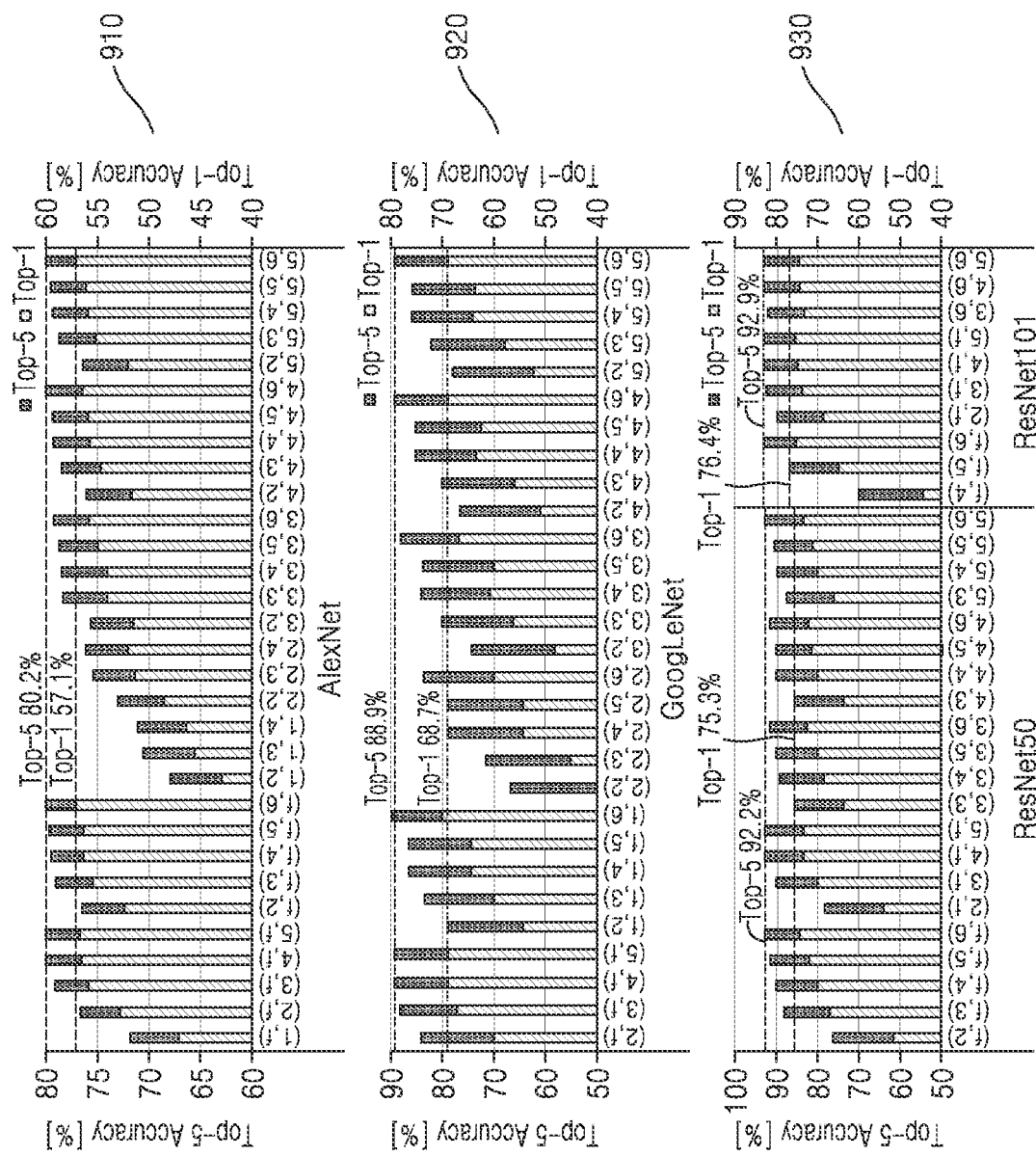
FIG. 9 illustrates diagrams showing example simulation results with regard to an example neural network to which the weighted entropy-based quantization is applied according to one or more embodiments.

FIG. 9 shows diagrams illustrating example simulation results with regard to an example neural network using weighted entropy-based quantization according to one or more embodiments.

FIG. 9 illustrates simulation results with regard to example convolutional neural networks (CNNs) respectively quantized by using an example weighted entropy-based quantization method according to one or more embodiments. The example architectures of the CNNs include AlexNet, GoogLeNet, ResNet50, and ResNet101. In the simulation results illustrated in FIG. 9, a notation of (x,y) may indicate that x is a bit length of a weight and y is a bit length of an activation according to a quantization result.

Referring to an AlexNet simulation result 910 quantized by using the example weighted entropy-based quantization method, optimal quantization configurations using the fewest number of bits while satisfying an 1% top-5 accuracy loss constraint may be (3, 6), (4, 4), (4, 5), and (4, 6). For example, (4, 4) may mean that the bit lengths of both the weights and the activations have all been reduced to 4 bits while maintaining less than about 1% loss of top-5 accuracy. According to the example applied weighted entropy quantization method, the computational is considerably reduced and the accuracy loss is not large, e.g., compared to when quantization is not implemented or only typical non-entropy-based linear or log based quantizations are implemented, even though the bit lengths of both the weights and the activations are all reduced to 4 bits.

On the other hand, referring to a GoogLeNet simulation result 920 quantized by using the example weighted entropy-based quantization method, it may be seen that the weights and the activations have been quantized into only 4 to 5 bits under the 1% accuracy loss constraint. In addition, referring to a ResNet 50/ResNet 101 simulation result 930 quantized by the example weighted entropy-based quantization method, the 1% accuracy loss constraint may be satisfied even when the weights are quantized into about 3 bits and the activations are quantized into about 6 bits in neural networks having 50 and 101 layers.

Referring to the simulation results in FIG. 9 again, it may be concluded that a weighted entropy-based quantization method according to one or more embodiments, compared with methods using full-precision data as is, for example, attains a significant reduction in the size of the model and the computational amount while maintaining a non-significant accuracy loss, as discussed above.

Figure 10:
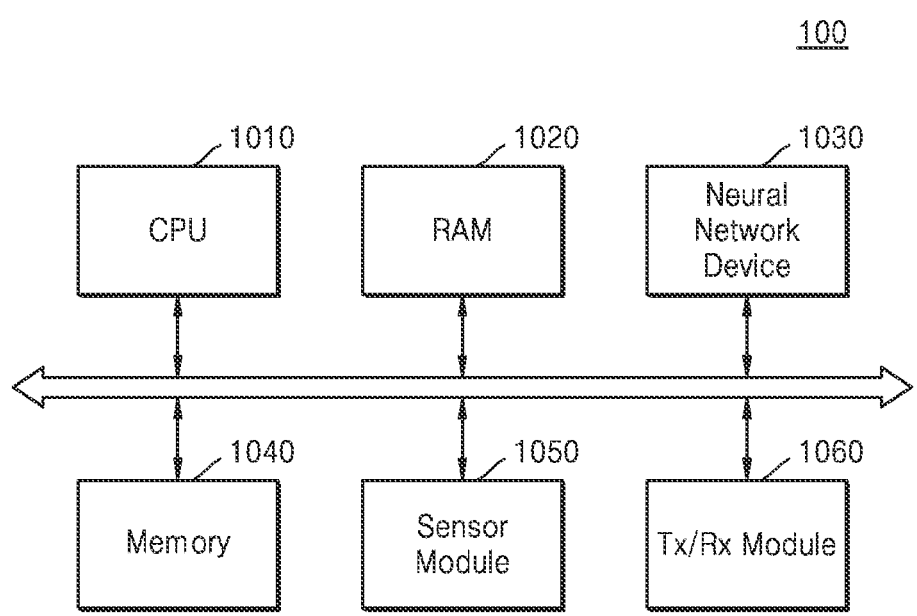
FIG. 10 is a block diagram illustrating a configuration of an electronic system according to one or more embodiments.

FIG. 10 is a block diagram illustrating a configuration of an electronic system 100 according to one or more embodiments.

The electronic system 100 according to one or more embodiments may analyze input data in real time by using any example neural network described above, extract validity information based on results of the implementation of the example neural network, make a situation determination based on the extracted validity information, such as unlocking a user interface of the electronic system 100 upon successful validation of a user's captured image or successful user voice recognition, or control whether further operations and/or further components of the electronic system 100 are implemented or activated based on extracted validity information, such as an example access to or transmission of financial or payment information upon successful validity of the identify of a user operating the electronic system 100. In additional examples, the electronic system 100 may be applied to a robotic apparatus such as a drone and an advanced drivers assistance system (ADAS), a smart TV, a smart phone, a medical apparatus, a mobile apparatus, an image display apparatus, an internet of things (IoT) apparatus, etc., and may be installed on one of other various kinds of electronic apparatus.

Referring to FIG. 10, the electronic system 100 may include a central processing unit (CPU) 1010, a random access memory (RAM) 1020, a neural network apparatus/device 1030, a memory 1040, a sensor module 1050, and a communication module 1060. The electronic system 100 may further include an input/output module, a security module, a power control apparatus, etc. In an embodiment, some components of the electronic system 100, such as the CPU 1010, the RAM 1020, the neural network device 1030, the memory 1040, the sensor module 1050, and the communication module 1060, may be installed on one semiconductor chip.

The CPU 1010 may control an overall operation of the electronic system 100, for example. The CPU 1010 may include one processor core (single core) or a plurality of processor cores (multi-cores). The CPU 1010 may process or perform programs and/or data stored in the memory 1040. In an embodiment, the CPU 1010 may control functions of the neural network device 1030, such as by executing or implementing corresponding instructions stored in the non-transitory memory 1040. The example memory 1040 may store trained parameters of one or more neural networks, the trained parameters may include full-precision data and/or corresponding distribution and importance based quantized parameters stored during implementation of one or more above entropy-based quantization processes during respective trainings of such neural networks or subsequent thereto. The CPU 1010 or the neural network device 1030 may implement such entropy-based quantizations during training, after training and before inference processes using a neural network, or during such inference processes.

The RAM 1020 may temporarily store programs, data, or instructions. For example, the programs and/or data stored in the memory 1040 may be temporarily stored in the RAM 1020 in accordance with the control of the CPU 1010 or a booting code. The RAM 1020 may be dynamic RAM (DRAM) and static RAM (SRAM).

The neural network device 1030 may perform computation by configuring the example neural network based on received input data and generate an information signal based on a result of computation. The neural networks may include CNN, NN, RNN, deep belief networks, restricted Boltzmann machines, etc. However, embodiments are not limited thereto.

The information signal may include one of various kinds of recognition signals such as a speech recognition signal, an object recognition signal, an image recognition signal, and a biometric information recognition signal. For example, the neural network device 1030 may receive frame data included in a video stream as an input data and generate from the frame data the recognition signal for an object included in the image represented by the frame data. The recognition signal may indicate whether the object is recognized or whether the object is not recognized. However, embodiments are not limited thereto. Depending varied embodiments of different types and functions of the electronic system 100, the neural network device 1030 may receive various kinds of input data and generate the recognition signal in accordance with the input data. An example of such a neural network device 1030, according to one or more embodiments, will be described in more detail with reference to FIG. 11.

The memory 1040, as a storage area for storing data, may store an operating system (OS), various programs, and various data. In an embodiment, the memory 1040 may store intermediate results generated during computation operation of the neural network device 1030. In addition, as noted above, the memory 1040 may store various parameters which when read and implemented configure the neural network device 1030 as a corresponding neural network corresponding to the stored parameters.

The memory 1040 may be DRAM, but is not limited thereto. The memory 1040 may include at least one of a volatile memory or a nonvolatile memory. The nonvolatile memory may include a read only memory (ROM), a programmable ROM (PROM), an electrically PROM (EPROM), an electrically erasable PROM (EEP ROM), a flash memory, a phase-change RAM (PRAM), a magnetic RAM (MRAM), a resistive RAM (RRAM), a ferroelectric RAM (FRAM), etc. The volatile memory may include the DRAM, the SRAM, a synchronous DRAM (SDRAM), the PRAM, the MRAM, the RRAM, the FRAM, etc. In an embodiment, the memory 1040 may be at least one of a hard disk drive (HDD), a solid state drive (SSD), a compact flash (CF), a secure digital (SD), a micro secure digital (Micro-SD), a mini SD (mini-SD), an extreme digital (xD), or a memory stick.

The sensor module 1050 can collect information around the electronic system 100. The sensor module 1050 can sense or receive from the outside of the electronic system 100 a signal (for example, a video signal, a voice signal, a magnetic signal, a biological signal, a touch signal, etc.) and convert the sensed or received signal into data. To this end, the sensor module 1050 may include at least one of various kinds of sensing apparatuses such as a microphone, an image sensing apparatus, an image sensor, a light detection and ranging (LIDAR) sensor, an ultrasonic sensor, an infrared sensor, a biosensor, and a touch sensor. In an example, the electronic system 100 is an electronic apparatus, as discussed above.

The sensor module 1050 may provide converted or captured data as input data to the neural network device 1030. For example, the sensor module 1050 may include the image sensor and sequentially take pictures of an external environment of the electronic system 100, produce a video stream, and provide a continuous data frame of the video stream to the neural network device 1030 as the input data. However, embodiments are not limited thereto and the sensor module 1050 may provide various kinds of data to the neural network device 1030.

The communication module 1060 may include various wired or wireless interfaces capable of communicating with external apparatuses. For example, the communication module 1060 may include a wired local area network (LAN), a wireless local area network (WLAN) such as wireless fidelity (Wi-Fi), a wireless personal area network (WPAN) such as Bluetooth, wireless universal serial bus (USB), Zigbee, near field communication (NFC), radio frequency identification (RFID), power line communication (PLC), or a communication interface connectable to a mobile cellular network such as $3^{rd}$ generation (3G), $4^{th}$ generation (4G) and long term evolution (LTE).

In an embodiment, the communication module 1060 may receive data from an external server. The external server may perform training based on a vast amount of training data and provide the electronic system 100 with a weight map or a weight list that includes trained weights. The received weight map or the weight list may be stored in the memory 1040. The received weight map or weight list, for example, may represent an updating of a previously stored weight map or weight list, e.g., as updated parameters for implementing an updated or revised corresponding neural network.

Figure 11:
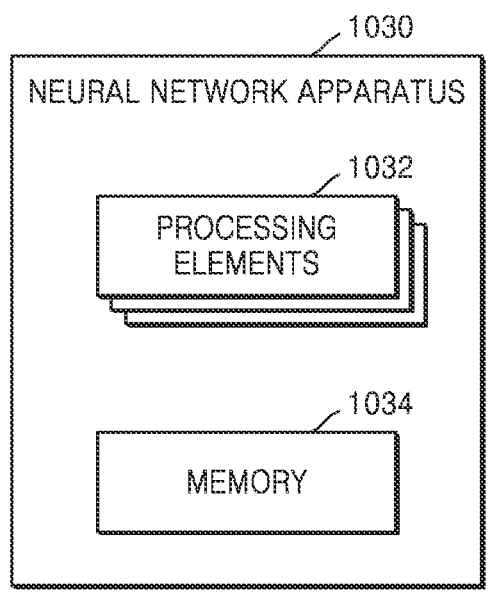
FIG. 11 is a block diagram illustrating a configuration of a neural network apparatus according to one or more embodiments.

FIG. 11 is a block diagram illustrating a configuration of a neural network apparatus according to one or more embodiments.

As illustrated in FIG. 11, and though not limited thereto, the neural network apparatus 1030 of FIG. 11 may correspond to the neural network device 1030 of FIG. 10, and may controlled to be configured as a neural network, or to implement the neural network. The neural network apparatus 1030 may include one or more processing elements 1032 and a memory 1034. Though only such processing elements 1032 and an example memory 1034 are illustrated in FIG. 11, based on the remainder of the disclosure herein it is apparent to those skilled in the art that the neural network apparatus 1030 may further include general components other than the components illustrated in FIG. 11. The neural network apparatus 1030 may thus be an electronic system or device and include such further components such as the electronic system 100 of FIG. 10.

The neural network apparatus 1030 may also correspond to any or any combination of the neural network apparatuses described in FIGS. 1 through 8, or may be configured to implement any or any combination of the distribution and importance based quantizations described herein, such as any or any combination of the weighted entropy-based quantizations described herein and entropy-based log base activation quantizations described herein. Thus, the methods described with respect to FIGS. 1 through 8 for performing an example optimal quantization by using weighted entropy-based quantization method are also applicable to the neural network apparatus 1030.

The neural network apparatus 1030 may be representative of, or included in, at least one of a consumer electronics product, a mobile computing apparatus, and a server, or may be wired to or wirelessly connected to at least one of the consumer electronics product, the mobile computing apparatus, and the server. In addition, the neural network apparatus 1030 may be implemented as a combination of a device and the server. For example, in an example, one or more of the processing elements 1032 and memory 1034 may be included in a neural network system. In addition, such a neural network system may further be configured to receive a user's input with one device, the server may perform training of the neural network, and either of the device or the server may perform the inference process to implement the trained neural network. For example, when the server performs the inference process, the server may be provided input from the device via communication between the device and the server, with further communication between the server and the device providing the device with results of the inference process. Of course, the inference process implementing the trained neural network may also be performed in a single device that also captures the input and indicates results of the inference process, noting that alternative embodiments are also available.

Each of the processing elements 1032 may be implemented by one or more processors. For example, each of the processing elements 1032 may be implemented as an array of a plurality of logic gates or as a combination of a general purpose microprocessor and a memory storing a program performable in the general purpose microprocessor. For example, each of the processing elements 1032 may be a CPU, a graphics processing unit (GPU), a hardware accelerator, or the like. Each of the processing elements 1032 may include a dedicated memory for storing the set of weights and the set of activations.

The processing elements 1032 may also serve as, or represent, an overall controller for controlling the neural network apparatus 1030. For example, at least one of the processing elements 1032 may entirely control the neural network apparatus 1030 by implementing or executing instructions stored in the memory 1034 in the neural network apparatus 1030. In addition, each of the processing elements 1032 may perform a function of the neural network apparatus 1030 in parallel by performing instructions stored in the memory 1034, such as the example entropy based quantization operations of FIGS. 5 and 6, as well as additional or alternative instructions.

Each of the processing elements 1032 may perform a function of one or more or each of the nodes included in the layers of the neural network. For example, each of the processing elements 1032 may execute a neural network operation or a matrix operation by using weights and activations, such as activations from a previous layer or from the same layer at a previous time. In addition, each of the processing elements 1032 may be configured to perform neural network implementation functions, as well any or all of the above quantization operations, described above in FIGS. 1 through 8. Still further, the processing elements 1032 may also be configured to train the neural network, e.g., based on training data, as also discussed above.

The processing elements 1032 may obtain the set of floating point data processed in a layer included in the neural network. The set of floating point data may be the set of activations processed in the layer or the set of weights processed in the layer, or there may be a set of floating point activations and a set of floating point weights.

The processing elements 1032 may determine a weighted entropy based on data values included in either set of floating point data, or respectively for each sets of floating point data. A weighted entropy may be determined by applying a weighting factor based on sizes of the data values to a distribution of data values included in the corresponding set of floating point data.

When the set of floating point data is the set of weights, the processing elements 1032 may group the set of weights into a plurality of clusters. When it is determined to classify the weights into N quantization levels, the processing elements 1032 may classify each of the weights by the size and map each of the weights into one of the N clusters.

The processing elements 1032 may determine the relative frequency of each of the grouped clusters by dividing the respective total number of weights included in each of the grouped clusters by the total number of the weights included in the set of weights.

In addition, the processing elements 1032 may determine the representative importance of each of the grouped clusters based on the sizes of the weights included in each of the grouped clusters. For example, the processing elements 1032 may determine the importance values corresponding to the weights based on the sizes of the weights included in each of the grouped clusters, and may determine the representative importance values of each of the grouped clusters based on the determined importance values.

The processing elements 1032 may determine a weight corresponding to the representative importance value for each of the grouped clusters as a corresponding representative weight of each of the grouped clusters, and quantize the weights included in each of the grouped clusters into the corresponding representative weight of each of the clusters.

The processing elements 1032 may determine the weighted entropy based on relative frequency and representative importance. The processing elements 1032 may determine the weighted entropy of the set of weights including the grouped clusters based on the relative frequency and representative importance of each of the grouped clusters.

As described above, the processing elements 1032 may determine the weighted entropy of the set of weights based on a clustering entropy-based quantization method. However, unlike the case wherein the weights may be fixed after learning, or the case where quantized weights may be fixed after entropy-based quantization, the values of the activations may flexibly change depending on the input data during an inference process, and thus, it may be difficult to determine a weighted entropy for activations based on the clustering entropy-based quantization method implemented for the weights. Thus, an entropy-based log quantization method rather than the clustering entropy-based quantization method may be applied to the activations and when the set of floating point data is the set of activations, the quantization levels may be assigned by using an entropy-based log expression-based quantization method.

For example, the processing elements 1032 may determine a relative frequency for each of the quantization levels by dividing the respective total number of activations included in each of the quantization levels by the total number of activations included in the set of activations. In addition, the processing elements 1032 may determine a data value corresponding to each of the quantization levels as a corresponding representative importance for each of the quantization levels. The processing elements 1032 may then determine a weighted entropy based on the relative frequency and the representative importance.

Thus, the processing elements 1032 may adjust the quantization levels assigned to data values based on the weighted entropy. When data values included in the floating-point data set are quantized so that the weighted entropy of the floating-point data set is maximized, many quantization levels may be assigned between the both extreme ends of the frequency and the importance, and thus, the amount of computation needed for processing the data values may be reduced while the accuracy loss is minimized, as discussed above. Accordingly, the processing elements 1032 may adjust the quantization levels assigned to data values so that the weighted entropy is maximized.

For example, when the set of floating point data is the set of weights, the processing elements 1032 may adjust the quantization levels assigned to the data values by adjusting the boundaries of each of the clusters in a direction of increasing the weighted entropy.

When the set of floating point data is the set of activations, the processing elements 1032 may adjust the quantization levels assigned to the data values by adjusting in a direction of increasing the weighted entropy the value corresponding to the first quantization level among the quantization levels and a size of the interval between the quantization levels, such as by adjusting a log base and offset until entropy is maximized.

Accordingly, the processing elements 1032 may quantize the data values included in the set of floating point data in accordance with the adjusted quantization levels. As described above, the processing elements 1032 may adjust the quantization levels assigned to the data values so that the weighted entropy is maximized, and thus, when the data values included in the set of floating point data are quantized in accordance with the adjusted quantization levels, the amount of computation needed for processing the data values may be reduced while the accuracy loss is minimized.

The processing elements 1032 may repeatedly execute the above-described operations for each of a plurality of layers included in the neural network, thereby allocating optimized quantization levels to each of the plurality of layers. When the above-described operations are repeatedly executed for each of the plurality of layers included in the neural network, the adjusted quantization levels may be assigned and optimized for each of the plurality of layers.

In addition, the processing elements 1032 may control the neural network to learn using entropy-based quantized data values, and subsequently infer the output data from the input data by using the trained neural network that was trained based on the corresponding quantized data values. For example, when the processing elements 1032 perform a learning process of the neural network based on entropy-based quantized data values the inference process may use those resulting trained weights, for example, when performing inference processes. In an example, when the processing elements 1032 perform a learning process of the neural network using floating point values, e.g., without such entropy-based quantizations, the inference process may implement such entropy-based quantizations of the corresponding trained floating point values when performing the inference process using the corresponding trained neural network. In another example, the neural network apparatus 1030 may determine whether the neural network was trained using entropy-based quantized data values, resulting in the example corresponding trained parameters with the entropy-based quantization, and if yes, the neural network apparatus 1030 selects to not implement such entropy-based quantization during the inference process. If no, the neural network apparatus 1030 selects to implement the entropy-based quantizations during the inference operations.

The memory 1034 may be hardware storing various data processed in the neural network apparatus 1030, as well as trained parameters or data values of one or more neural networks. For example, the memory 1034 may store data processed and data processed in the neural network apparatus 1030. In addition, the memory 1034 may store applications, drivers, and the like to be driven by the neural network apparatus 1030. The memory 1034 may include RAM, ROM, EEPROM, a compact disc ROM (CD-ROM), a Blu-ray, or other optical disk storage, an HDD, SSD, or flash memory.

In addition, the memory 1034 may further include an internal memory shared by the processing elements 1032 included in the neural network apparatus 1030 or a plurality of internal memories to support each of the processing elements 1032.

Any of the memories, or another non-transitory medium, may be computer-readable recording medium that store instructions, which when executed by one or more processors, causes the one or more processors to implement any of the processes described herein, such as the method of operation of the neural network apparatus 1030. In addition to the above memories, further examples of the computer-readable recording media may include magnetic media such as a hard disk, a floppy disk, and a magnetic tape, optical media such as the CD-ROM and a digital video disc (DVD), magneto-optical media such as a floptical disk, and a hardware apparatus, such as the ROM, the RAM, and the flash memory, specifically configured to store and execute program instructions. Examples of the instructions may include not only machine language codes generated by a compiler but also high-level language codes executable by a computer by using an interpreter or the like, such as further discussed below.

The neural network apparatuses, devices, and systems, processors, processing elements, memories, electronic devices and systems, CPU, RAM, sensor modules, and Tx/Rx module, as only examples, as discussed above with respect to FIGS. 1-11 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method, the method comprising:
    obtaining a set of weights and a set of activations from a set of floating point data processed in a layer included in a neural network;
    quantizing the set of weights using a clustering based quantization method;
    quantizing the set of activations using a logarithm data representation-based quantization method, which is different from the clustering based quantization method, in consideration that, while the set of weights is fixed after training the neural network, the set of activations varies in accordance with input data in an inference process implementing the neural network, with the quantizing the set of activations comprising, using one or more processors:
        repeating, for a plurality of iterations,
            for a current iteration among the plurality of iterations, quantizing the set of activations into a corresponding plurality of log-based quantization levels based on a corresponding one or more parameters that control a corresponding first size of a first value corresponding to a first quantization level among the corresponding plurality of log-based quantization levels and a corresponding first interval size between the corresponding plurality of log-based quantization levels, for the current iteration, determining the activation weighted entropy for the corresponding plurality of log-based quantization levels of the current iteration by applying corresponding determined importance weights for the corresponding plurality of log-based quantization levels of the current iteration to relative, compared to a total number of activations in the set of activations, activation frequencies of each of the corresponding plurality of log-based quantization levels of the current iteration, and setting the corresponding one or more parameters of a next iteration among the plurality of iterations, while the determined activation weighted entropy of the current iteration is not determined to be maximized and the current iteration is not a final iteration among the plurality of iterations;

quantizing the set of activations into a final plurality of log-based quantization levels that are based on the set corresponding one or more parameters of one of the plurality of iterations that has a determined maximized activation weighted entropy;

executing, based on input data provided to the neural network, the neural network using the set of activations that have been quantized into the final plurality of log-based quantization levels; and indicating a result of the executing of the neural network.

2. The method of claim 1, wherein, the obtaining of the set of activations, the repeating, the quantizing of the set of activations into the final plurality of log-based quantization levels, the executing of the neural network, and the indicating are performed for each of a plurality of layers included in the neural network.

3. The method of claim 1, further comprising training the layer of the neural network based on the set of activations that have been quantized into the final plurality of log-based quantization levels, wherein the executing of the neural network and the indicating of the result are operations of the training of the layer of the neural network.

4. The method of claim 1, wherein the floating point data includes weight quantization levels, assigned for the set of weights, that are adjusted based on a weight weighted entropy, and wherein the quantizing of the set of weights using the clustering based quantization method is performed in accordance with the adjusted weight quantization levels.

5. The method of claim 1, wherein the corresponding determined importance weights of each of the plurality of iterations are based on respective set importances of the each of the activations.

6. A neural network apparatus, the apparatus comprising:
one or more processors; and
one or more memories comprising code, which when executed by the one or more processors configures the one or more processors to:
obtain a set of weights and a set of activations from a set of floating point data processed in a layer included in a neural network;
quantize the set of weights using a clustering based quantization method;
quantize the set of activations using a logarithm data representation-based quantization method, which is different from the clustering based quantization method, in consideration that, while the set of weights is fixed after training the neural network, the set of activations varies in accordance with input data in an inference process implementing the neural network, with the quantization of the set of activations comprising
a repetition, for a plurality of iterations,
for a current iteration among the plurality of iterations, a quantization of the set of activations into a corresponding plurality of log-based quantization levels based on a corresponding one or more parameters that control a corresponding first size of a first value corresponding to a first quantization level among the corresponding plurality of log-based quantization levels and a corresponding first interval size between the corresponding plurality of log-based quantization levels, for the current iteration, a determination of the activation weighted entropy for the corresponding plurality of log-based quantization levels of the current iteration through an application of corresponding determined importance weights for the corresponding plurality of log-based quantization levels of the current iteration to relative, compared to a total number of activations in the set of activations, activation frequencies of each of the corresponding plurality of log-based quantization levels of the current iteration, and set the corresponding one or more parameters of a next iteration among the plurality of iterations, while the determined activation weighted entropy of the current iteration is not determined to be maximized and the current iteration is not a final iteration among the plurality of iterations;

quantize the quantized set of activations into a final plurality of log-based quantization levels that are based on the set corresponding one or more parameters of one of the plurality of iterations that has a determined maximized activation weighted entropy;

execute, based on input data provided to the neural network, the neural network using the set of activations that have been quantized into the final plurality of log-based quantization levels; and indicate a result of the execution of the neural network.

7. The apparatus of claim 6, wherein the execution of the code configures the one or more processors to perform the obtaining of the set of activations, the repeating, the quantizing of the set of activations into the final plurality of log-based quantization levels, the executing of the neural network, and the indicating for each of a plurality of layers included in the neural network.

8. The apparatus of claim 6, wherein the floating point data includes weight quantization levels, assigned for the set of weights, that are adjusted based on a weight weighted entropy, and wherein the quantizing of the set of weights using the clustering based quantization method is performed in accordance with the adjusted weight quantization levels.

9. The apparatus of claim 6, wherein the corresponding determined importance weights of each of the plurality of iterations are based on respective set importances of the each of the activations.

10. The apparatus of claim 6, wherein the execution of the code configures the one or more processors to train the layer of the neural network based on the set of activations quantized into the corresponding plurality of log-based quantization levels, wherein the execution of the neural network and the indication of the result are operations of the training of the layer of the neural network.

* * * * *